(12) United States Patent
Izumikawa et al.

(10) Patent No.: US 11,148,593 B2
(45) Date of Patent: Oct. 19, 2021

(54) CONSTRUCTION MACHINE SAFETY MANAGEMENT SYSTEM, MANAGEMENT APPARATUS

(71) Applicant: SUMITOMO(S.H.I.) CONSTRUCTION MACHINERY CO., LTD., Tokyo (JP)

(72) Inventors: Takeya Izumikawa, Chiba (JP); Hidehiko Katoh, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/389,018

(22) Filed: Apr. 19, 2019

(65) Prior Publication Data

US 2019/0241124 A1  Aug. 8, 2019

Related U.S. Application Data

(63) Continuation of application No. PCT/JP2017/039457, filed on Oct. 31, 2017.

(30) Foreign Application Priority Data

Nov. 1, 2016  (JP) .............................. JP2016-214715

(51) Int. Cl.
*B60R 1/00* (2006.01)
*E02F 9/26* (2006.01)
(Continued)

(52) U.S. Cl.
CPC .............. *B60R 1/00* (2013.01); *B60R 11/04* (2013.01); *E02F 9/26* (2013.01); *G06K 9/00369* (2013.01);
(Continued)

(58) Field of Classification Search
CPC .............. B60R 1/00; B60R 2300/105; B60R 2300/8093; B60R 11/04; H04N 7/18;
(Continued)

(56) References Cited

U.S. PATENT DOCUMENTS 10,750,082 B2 * 8/2020 Takahashi .............. E02F 9/261
2014/0257647 A1 * 9/2014 Wu .......................... E02F 9/24
701/50
(Continued)

FOREIGN PATENT DOCUMENTS

| EP | 2570556 | 3/2013 |
|---|---|---|
| EP | 2978213 | 1/2016 |

(Continued)

OTHER PUBLICATIONS

International Search Report for PCT/JP2017/039457 dated Jan. 23, 2018 (with English translation).

*Primary Examiner* — Tung T Vo
(74) *Attorney, Agent, or Firm* — IPUSA, PLLC

(57) ABSTRACT

A construction machine safety management system includes an information generating unit that generates information representing a relationship between a detection result and predetermined related information, based on the detection result obtained by a detecting unit that detects entry of an obstacle into a predetermined area around a construction machine and the predetermined related information corresponding to the detection result.

18 Claims, 17 Drawing Sheets

(51) Int. Cl.
*H04N 7/18* (2006.01)
*G06T 7/70* (2017.01)
*B60R 11/04* (2006.01)
*G08B 21/22* (2006.01)
*G08B 21/24* (2006.01)
*G06K 9/00* (2006.01)
*G08B 25/00* (2006.01)

(52) U.S. Cl.
CPC ............ *G06K 9/00805* (2013.01); *G06T 7/70* (2017.01); *G08B 21/22* (2013.01); *G08B 21/24* (2013.01); *G08B 25/00* (2013.01); *H04N 7/18* (2013.01); *B60R 2300/105* (2013.01); *B60R 2300/8093* (2013.01); *G06T 2207/30242* (2013.01); *G06T 2207/30261* (2013.01)

(58) Field of Classification Search
CPC ............ G06K 9/00805; G06K 9/00369; G06T 2207/30242; G06T 7/70; G06T 2207/30261; E02F 9/24; E02F 9/261; E02F 9/26; G08B 13/19613; G08B 25/08; G08B 25/00; G08B 21/24; G08B 21/22
USPC .................................................. 348/143, 148
See application file for complete search history.

(56) References Cited

U.S. PATENT DOCUMENTS

| | | | | |
|---|---|---|---|---|
| 2016/0006947 | A1* | 1/2016 | Kowatari | H04N 7/18 |
| | | | | 348/148 |
| 2016/0217331 | A1* | 7/2016 | Kowatari | E02F 9/261 |
| 2016/0224026 | A1* | 8/2016 | Hamada | G05D 1/0011 |
| 2016/0237640 | A1* | 8/2016 | Carpenter | E02F 9/2825 |
| 2017/0298595 | A1* | 10/2017 | Machida | E02F 9/24 |
| 2018/0295357 | A1* | 10/2018 | Okumura | E02F 9/26 |
| 2019/0277004 | A1* | 9/2019 | Hashimoto | E02F 9/24 |

FOREIGN PATENT DOCUMENTS

| | | |
|---|---|---|
| JP | 2004-266623 | 9/2004 |
| JP | 2007-085091 | 4/2007 |
| JP | 2010-198519 | 9/2010 |
| JP | 2011-163835 | 8/2011 |
| JP | 2011-165143 | 8/2011 |

* cited by examiner

FIG.4

| NUMBER OF TIMES DETECTED | DATE AND TIME | | | NUMBER OF PERSONS | DETECTION LOCATION | ALARM LEVEL | SUBSEQUENT ACTION | OPERATION STATE | WORK MODE | ADDITIONAL INFORMATION |
|---|---|---|---|---|---|---|---|---|---|---|
| | DATE | DAY OF WEEK | TIME | | | | | | | IMAGE INFORMATION (IDENTIFIER) |
| 1 | Sept. 1 | THUR | 11:03 | 1 | REAR | CAUTION | EVACUATE | TRAVEL | A | AAA |
| 2 | Sept. 1 | THUR | 11:09 | 1 | LEFT | CAUTION | EVACUATE | TURN | H | BBB |
| 3 | Sept. 1 | THUR | 11:16 | 2 | REAR | WARNING | EVACUATE | NONE | A | CCC |
| | | | | | RIGHT | CAUTION | CONTINUE | | | |
| ... | | | ... | ... | ... | ... | ... | ... | ... | ... |
| 10 | Sept. 1 | THUR | 11:51 | 1 | REAR | CAUTION | EVACUATE | WORK | HP | JJJ |
| ... | | | ... | ... | ... | ... | ... | ... | ... | ... |

FIG.5

| TIME PERIOD | 11:00 – 12:00 | | |
|---|---|---|---|
| NUMBER OF TIMES DETECTED | | | 10 |
| | PER ALARM LEVEL | CAUTION | 2 |
| | | WARNING | 8 |
| | PER OPERATION STATE | TRAVEL | 1 |
| | | NON-TRAVEL | 9 |
| | | TURN | 2 |
| | | NON-TURN | 8 |
| | | WORK | 3 |
| | | NON-WORK | 7 |
| | PER WORK MODE | SP | 1 |
| | | H | 1 |
| | | A | 8 |
| NUMBER OF PERSONS DETECTED | | | 11 |
| | PER DETECTION LOCATION | RIGHT | 2 |
| | | LEFT | 3 |
| | | REAR | 6 |
| | PER SUBSEQUENT ACTION | EVACUATE | 9 |
| | | CONTINUE | 2 |
| ADDITIONAL INFORMATION | IMAGE | $1^{ST}$ TIME | LINK 1 |
| | | $2^{ND}$ TIME | LINK 2 |
| | | $3^{RD}$ TIME | LINK 3 |
| | | $4^{TH}$ TIME | LINK 4 |
| | | $5^{TH}$ TIME | LINK 5 |
| | | $6^{TH}$ TIME | LINK 6 |
| | | $7^{TH}$ TIME | LINK 7 |
| | | $8^{TH}$ TIME | LINK 8 |
| | | $9^{TH}$ TIME | LINK 9 |
| | | $10^{TH}$ TIME | LINK 10 |

FIG.6

| DETECTION LOCATION | REAR AREA | | |
|---|---|---|---|
| NUMBER OF TIMES DETECTED | | | 10 |
| | PER TIME PERIOD | BETWEEN 9 AND 10 | 0 |
| | | BETWEEN 10 AND 11 | 1 |
| | | BETWEEN 11 AND 12 | 5 |
| | | BETWEEN 13 AND 14 | 4 |
| | PER ALARM LEVEL | CAUTION | 2 |
| | | WARNING | 8 |
| | PER OPERATION STATE | TRAVEL | 1 |
| | | NON-TRAVEL | 9 |
| | | TURN | 2 |
| | | NON-TURN | 8 |
| | | WORK | 3 |
| | | NON-WORK | 7 |
| | PER WORK MODE | SP | 1 |
| | | H | 1 |
| | | A | 8 |
| NUMBER OF PERSONS DETECTED | | | 10 |
| | PER SUBSEQUENT ACTION | EVACUATE | 9 |
| | | CONTINUE | 1 |
| ADDITIONAL INFORMATION | IMAGE | $1^{ST}$ TIME | LINK 1 |
| | | $2^{ND}$ TIME | LINK 2 |
| | | $3^{RD}$ TIME | LINK 3 |
| | | $4^{TH}$ TIME | LINK 4 |
| | | $5^{TH}$ TIME | LINK 5 |
| | | $6^{TH}$ TIME | LINK 6 |
| | | $7^{TH}$ TIME | LINK 7 |
| | | $8^{TH}$ TIME | LINK 8 |
| | | $9^{TH}$ TIME | LINK 9 |
| | | $10^{TH}$ TIME | LINK 10 |

FIG.7

| OPERATION STATE | WHEN TURNING | | |
|---|---|---|---|
| NUMBER OF TIMES DETECTED | | | 10 |
| | PER TIME PERIOD | BETWEEN 9 AND 10 | 0 |
| | | BETWEEN 10 AND 11 | 1 |
| | | BETWEEN 11 AND 12 | 5 |
| | | BETWEEN 13 AND 14 | 4 |
| | PER ALARM LEVEL | CAUTION | 2 |
| | | WARNING | 8 |
| | PER WORK MODE | SP | 1 |
| | | H | 1 |
| | | A | 8 |
| NUMBER OF PERSONS DETECTED | | | 10 |
| | PER DETECTION LOCATION | RIGHT | 1 |
| | | LEFT | 3 |
| | | REAR | 6 |
| | PER SUBSEQUENT ACTION | EVACUATE | 9 |
| | | CONTINUE | 1 |
| ADDITIONAL INFORMATION | IMAGE | 1$^{ST}$ TIME | LINK 1 |
| | | 2$^{ND}$ TIME | LINK 2 |
| | | 3$^{RD}$ TIME | LINK 3 |
| | | 4$^{TH}$ TIME | LINK 4 |
| | | 5$^{TH}$ TIME | LINK 5 |
| | | 6$^{TH}$ TIME | LINK 6 |
| | | 7$^{TH}$ TIME | LINK 7 |
| | | 8$^{TH}$ TIME | LINK 8 |
| | | 9$^{TH}$ TIME | LINK 9 |
| | | 10$^{TH}$ TIME | LINK 10 |

FIG.8

| WORK MODE | H MODE | | | |
|---|---|---|---|---|
| NUMBER OF TIMES DETECTED | | | | 10 |
| | PER TIME PERIOD | BETWEEN 9 AND 10 | | 0 |
| | | BETWEEN 10 AND 11 | | 1 |
| | | BETWEEN 11 AND 12 | | 5 |
| | | BETWEEN 13 AND 14 | | 4 |
| | PER ALARM LEVEL | CAUTION | | 2 |
| | | WARNING | | 8 |
| | PER OPERATION STATE | TRAVEL | | 1 |
| | | NON-TRAVEL | | 9 |
| | | TURN | | 2 |
| | | NON-TURN | | 8 |
| | | WORK | | 3 |
| | | NON-WORK | | 7 |
| NUMBER OF PERSONS DETECTED | | | | 10 |
| | PER DETECTION LOCATION | RIGHT | | 1 |
| | | LEFT | | 3 |
| | | REAR | | 6 |
| | PER SUBSEQUENT ACTION | EVACUATE | | 9 |
| | | CONTINUE | | 1 |
| ADDITIONAL INFORMATION | IMAGE | $1^{ST}$ TIME | LINK 1 | |
| | | $2^{ND}$ TIME | LINK 2 | |
| | | $3^{RD}$ TIME | LINK 3 | |
| | | $4^{TH}$ TIME | LINK 4 | |
| | | $5^{TH}$ TIME | LINK 5 | |
| | | $6^{TH}$ TIME | LINK 6 | |
| | | $7^{TH}$ TIME | LINK 7 | |
| | | $8^{TH}$ TIME | LINK 8 | |
| | | $9^{TH}$ TIME | LINK 9 | |
| | | $10^{TH}$ TIME | LINK 10 | |

FIG.9

| ALARM LEVEL | WARNING | | |
|---|---|---|---|
| NUMBER OF TIMES DETECTED | | | 10 |
| | PER TIME PERIOD | BETWEEN 9 AND 10 | 0 |
| | | BETWEEN 10 AND 11 | 1 |
| | | BETWEEN 11 AND 12 | 5 |
| | | BETWEEN 13 AND 14 | 4 |
| | PER OPERATION STATE | TRAVEL | 1 |
| | | NON-TRAVEL | 9 |
| | | TURN | 2 |
| | | NON-TURN | 8 |
| | | WORK | 3 |
| | | NON-WORK | 7 |
| | PER WORK MODE | SP | 1 |
| | | H | 1 |
| | | A | 8 |
| NUMBER OF PERSONS DETECTED | | | 10 |
| | PER DETECTION LOCATION | RIGHT | 1 |
| | | LEFT | 3 |
| | | REAR | 6 |
| | PER SUBSEQUENT ACTION | EVACUATE | 9 |
| | | CONTINUE | 1 |
| ADDITIONAL INFORMATION | IMAGE | $1^{ST}$ TIME | LINK 1 |
| | | $2^{ND}$ TIME | LINK 2 |
| | | $3^{RD}$ TIME | LINK 3 |
| | | $4^{TH}$ TIME | LINK 4 |
| | | $5^{TH}$ TIME | LINK 5 |
| | | $6^{TH}$ TIME | LINK 6 |
| | | $7^{TH}$ TIME | LINK 7 |
| | | $8^{TH}$ TIME | LINK 8 |
| | | $9^{TH}$ TIME | LINK 9 |
| | | $10^{TH}$ TIME | LINK 10 |

FIG.10

| SEPTEMBER 5 (MONDAY) 10:30 | | | | |
|---|---|---|---|---|
| | | TOTAL | WARNING | CAUTION |
| NUMBER OF TIMES DETECTED | MONDAY | 21 | 6 | 15 |
| | TUESDAY | 11 | 3 | 8 |
| | WEDNESDAY | 9 | 0 | 9 |
| | THURSDAY | 12 | 1 | 11 |
| | FRIDAY | 25 | 10 | 15 |
| | SATURDAY | 0 | 0 | 0 |
| | SUNDAY | 0 | 0 | 0 |
| | MONDAY | 4 | 0 | 4 |
| NUMBER OF PERSONS DETECTED | MONDAY | 22 | 7 | 15 |
| | TUESDAY | 11 | 3 | 8 |
| | WEDNESDAY | 10 | 0 | 10 |
| | THURSDAY | 12 | 1 | 11 |
| | FRIDAY | 27 | 10 | 17 |
| | SATURDAY | 0 | 0 | 0 |
| | SUNDAY | 0 | 0 | 0 |
| | MONDAY | 4 | 0 | 4 |

FIG.12

| | | DETECTION FREQUENCY |
|---|---|---|
| PER TIME PERIOD | BETWEEN 9 AND 10 | 0 |
| | BETWEEN 10 AND 11 | 1 |
| | BETWEEN 11 AND 12 | 10 |
| | BETWEEN 13 AND 14 | 4 |
| | BETWEEN 14 AND 15 | 5 |
| | BETWEEN 15 AND 16 | 1 |
| | BETWEEN 16 AND 17 | 1 |
| | BETWEEN 17 AND 18 | 11 |
| PER OPERATION STATE | TRAVEL | 1 |
| | NON-TRAVEL | 3.2 |
| | TURN | 2 |
| | NON-TURN | 3.5 |
| | WORK | 1.5 |
| | NON-WORK | 1.9 |
| PER WORK MODE | SP | 5 |
| | H | 9 |
| | A | 19 |
| PER DETECTION LOCATION | RIGHT | 1.2 |
| | LEFT | 0.5 |
| | REAR | 2.1 |
| ATTITUDE STABILITY | LEVEL 1 | 3.5 |
| | LEVEL 2 | 2.1 |
| | LEVEL 3 | 0.8 |
| OPERATION CAPACITY | LEVEL 1 | 3.2 |
| | LEVEL 2 | 1.9 |
| | LEVEL 3 | 0.9 |

CONSTRUCTION MACHINE SAFETY MANAGEMENT SYSTEM, MANAGEMENT APPARATUS

CROSS-REFERENCE TO RELATED APPLICATION

The present application is a continuation of International Application No. PCT/JP2017/039457 filed on Oct. 31, 2017, which is based on and claims priority to Japanese Patent Application No. 2016-214715, filed on Nov. 1, 2016. The contents of these applications are incorporated herein by reference in their entirety.

BACKGROUND OF THE INVENTION

1. Field of the Invention

The present invention relates to a construction machine safety management system, etc.

2. Description of the Related Art

There is known a safety management apparatus that detects entry of a person (worker) into a predetermined area (monitor area) around a construction machine, transmits entry information to a computer that is located remotely to the construction machine, and stores/saves the entry information in the computer.

SUMMARY OF THE INVENTION

According to an embodiment of the present invention, there is provided a construction machine safety management system including an information generating unit that generates information representing a relationship between a detection result and predetermined related information, based on the detection result obtained by a detecting unit that detects entry of an obstacle into a predetermined area around a construction machine and the predetermined related information corresponding to the detection result.

BRIEF DESCRIPTION OF THE DRAWINGS

FIG. 4 is a diagram illustrating an example of entry history information according to an embodiment of the present invention;

FIG. 5 is a diagram illustrating a first example of entry degree information generated by an information generating unit according to an embodiment of the present invention;

FIG. 6 is a diagram illustrating a second example of entry degree information generated by the information generating unit according to an embodiment of the present invention;

FIG. 7 is a diagram illustrating a third example of entry degree information generated by the information generating unit according to an embodiment of the present invention;

FIG. 8 is a diagram illustrating a fourth example of entry degree information generated by the information generating unit according to an embodiment of the present invention;

FIG. 9 is a diagram illustrating a fifth example of entry degree information generated by the information generating unit according to an embodiment of the present invention;

FIG. 10 is a diagram illustrating a sixth example of entry degree information generated by the information generating unit according to an embodiment of the present invention;

FIG. 12 is a diagram illustrating a seventh example of entry degree information generated by the information generating unit according to an embodiment of the present invention;

DETAILED DESCRIPTION OF THE PREFERRED EMBODIMENTS

In the related art, it is possible to prompt the workers or the site supervisor at the work site to improve the safety after-the-fact, based on the stored entry information; however, with respect to situations presently occurring at the work site, it is not possible to immediately prompt the people at the work site to improve the safety.

Thus, in view of the above-described problem, it is desirable to provide a construction machine safety management system capable of improving the safety of a work site where a work machine is used, by a mode having relatively immediate effects.

Hereinafter, embodiments of the present invention will be described with reference to the drawings.

[Overview of Work Machine]

First, with reference to FIG. 1, a work machine included in a safety management system 100 (see FIG. 2) according to an embodiment will be described.

Figure 1:
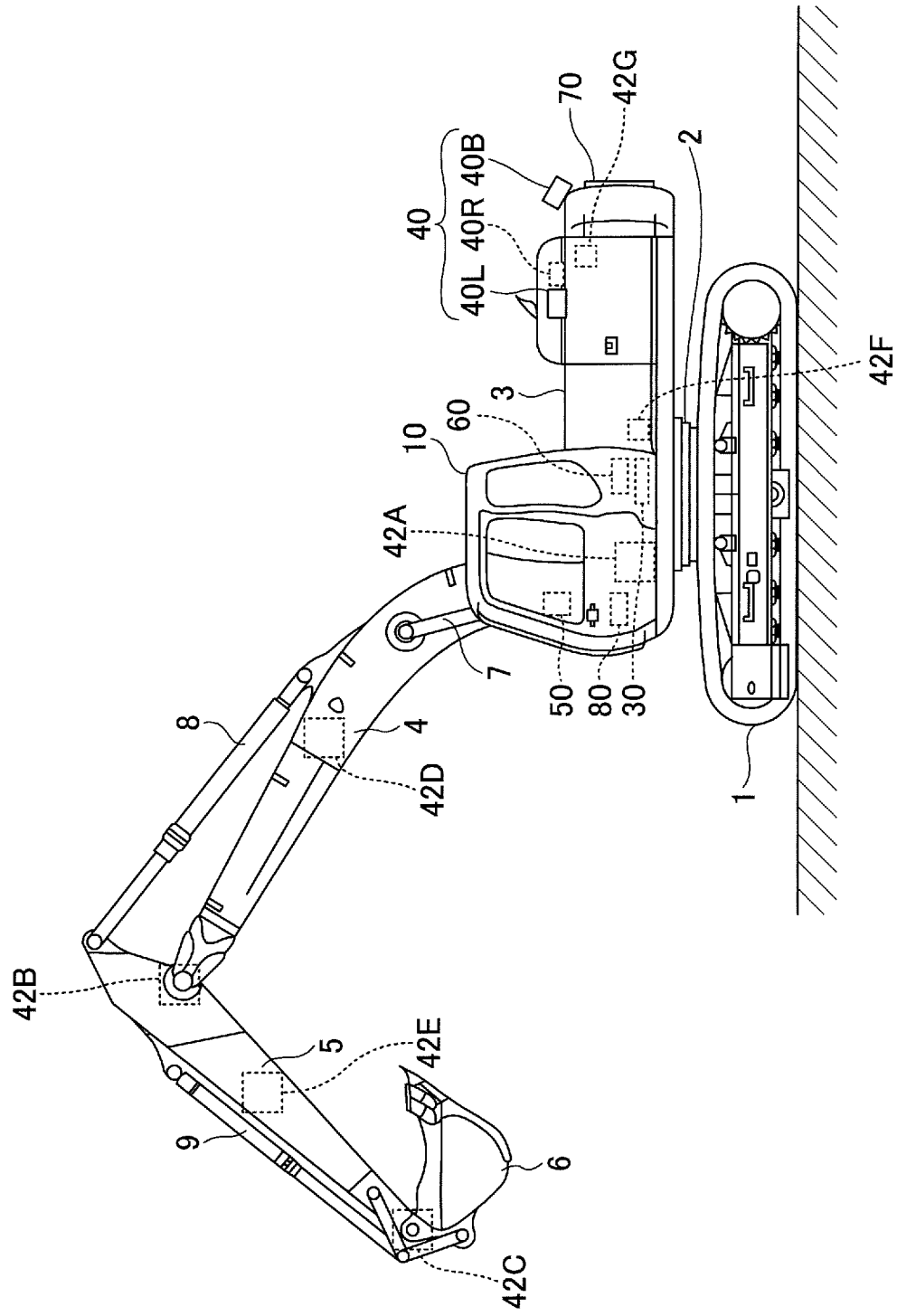
FIG. 1 is a diagram illustrating an example of a work machine according to an embodiment of the present invention.

FIG. 1 is a diagram illustrating an example of a work machine included in the safety management system 100 according to an embodiment, and more specifically, FIG. 1 is a side view of an excavator.

As a matter of course, the work machine included in the safety management system 100 according to an embodiment may be a work machine other than an excavator, for example, the work machine may be a wheel loader, an asphalt finisher or the like.

The excavator according to an embodiment includes, as a general configuration, a lower traveling body 1; an upper turning body 3 mounted on the lower traveling body 1 so as to be able to turn via a turning mechanism 2; a boom 4, an arm 5, and a bucket 6 as a work device; and a cabin 10 in which an operator rides.

The lower traveling body 1 includes, for example, a pair of left and right crawlers, and the excavator is caused to travel as the respective crawlers are hydraulically driven by a traveling hydraulic motor (not illustrated).

The upper turning body 3 turns with respect to the lower traveling body 1 by being driven by a turning hydraulic motor or an electric motor (both not illustrated).

The boom 4 is pivotably attached to the front center of the upper turning body 3 so as to be able to be elevated, and the arm 5 is pivotably attached to the tip of the boom 4 so as to be able to rotate up and down, and the bucket 6 is pivotably attached to the tip of the arm 5 so as to be able to rotate up and down. The boom 4, the arm 5, and the bucket 6 are hydraulically driven by a boom cylinder 7, an arm cylinder 8, and a bucket cylinder 9, respectively.

The cabin 10 is a cockpit where an operator rides, and is mounted on the front left side of the upper turning body 3.

Moreover, the excavator according to an embodiment includes, as a configuration relevant to the safety management system 100, a controller 30, an imaging device 40, a motion/attitude state sensor 42, a display device 50, a sound output device 60, an external alarm device 70, and a communication device 80.

The controller 30 is a control device that performs drive control of the excavator. The controller 30 is mounted in the cabin 10.

The imaging device 40 is attached to the upper portion of the upper turning body 3 and captures images of the area surrounding the excavator. The imaging device 40 includes a rear camera 40B, a left-side camera 40L, and a right-side camera 40R.

The rear camera 40B is attached to the upper rear end of the upper turning body 3 and captures images of the rear area of the upper turning body 3.

The left-side camera 40L is attached to the upper left end of the upper turning body 3 and captures images of the area on the left side of the upper turning body 3.

The right-side camera 40R is attached to the upper right end of the upper turning body 3 and captures images of the area on the right side of the upper turning body 3.

The motion/attitude state sensor 42 is a sensor that detects the motion state or the attitude state of the excavator. The motion/attitude state sensor 42 includes a boom angle sensor 42A, an arm angle sensor 42B, a bucket angle sensor 42C, three-axis inertial measurement units (IMU) 42D and 42E, a turning angle sensor 42F, and an acceleration sensor 42G.

The boom angle sensor 42A detects an elevation angle (hereinafter, referred to as "boom angle") of the boom 4 with reference to the upper turning body 3. The boom angle sensor 42A is, for example, a rotary encoder, and the same applies to the arm angle sensor 42B, the bucket angle sensor 42C, and the turning angle sensor 42F.

The arm angle sensor 42B detects a rotation angle of the arm 5 with reference to the boom 4 (hereinafter, referred to as "arm angle").

The bucket angle sensor 42C detects a rotation angle of the bucket 6 with reference to the arm 5 (hereinafter referred to as "bucket angle").

The IMU 42D is attached to the boom 4 and detects the acceleration of the boom 4 along predetermined three axes and the angular acceleration of the boom 4 around the predetermined three axes.

The IMU 42E is attached to the arm 5 and detects the acceleration of the arm 5 along predetermined three axes and the angular acceleration of the arm 5 around the predetermined three axes.

The turning angle sensor 42F detects a turning angle of the upper turning body 3 with reference to a predetermined angular direction of the upper turning body 3.

The acceleration sensor 42G is attached to a position away from the pivot axis of the upper turning body 3, and detects the acceleration of the upper turning body 3 at the position to which the acceleration sensor 42G is attached. Thus, based on the detection result of the acceleration sensor 42G, it can be determined whether the upper turning body 3 is turning or whether the lower traveling body 1 is traveling, etc.

The display device 50 is provided in the area of the cockpit in the cabin 10, and displays various kinds of image information to be reported to the operator under the control of the controller 30 (a display control unit 304 described later).

The sound output device 60 is provided around the cockpit in the cabin 10, and outputs various kinds of sound information to be reported to the operator under the control of the controller 30. The sound output device 60 is, for example, a speaker or a buzzer, etc.

The external alarm device 70 gives alarms to the workers around the excavator or the site supervisor of the work site and the like. The external alarm device 70 may include, for example, a light source (lighting device) that lights up or blinks, etc., toward a worker or the like around the excavator. Furthermore, the external alarm device 70 may include an external display device that presents image information (text information, drawing information, and the like) to the operator, etc., around the excavator. Furthermore, the external alarm device 70 may include an external sound output device such as a speaker or a buzzer that outputs sound information to a worker or the like around the excavator.

The communication device 80 is a communication device that communicates with a remote external device (for example, a management server 200 to be described later) through a predetermined communication network 150 (see FIG. 2; for example, a mobile phone network or the Internet network with a base station at the end) based on a predetermined radio communication standard.

[Configuration of Safety Management System]

Next, the configuration of the safety management system 100 will be described with reference to FIGS. 2A to 2C.

Figure 2A:
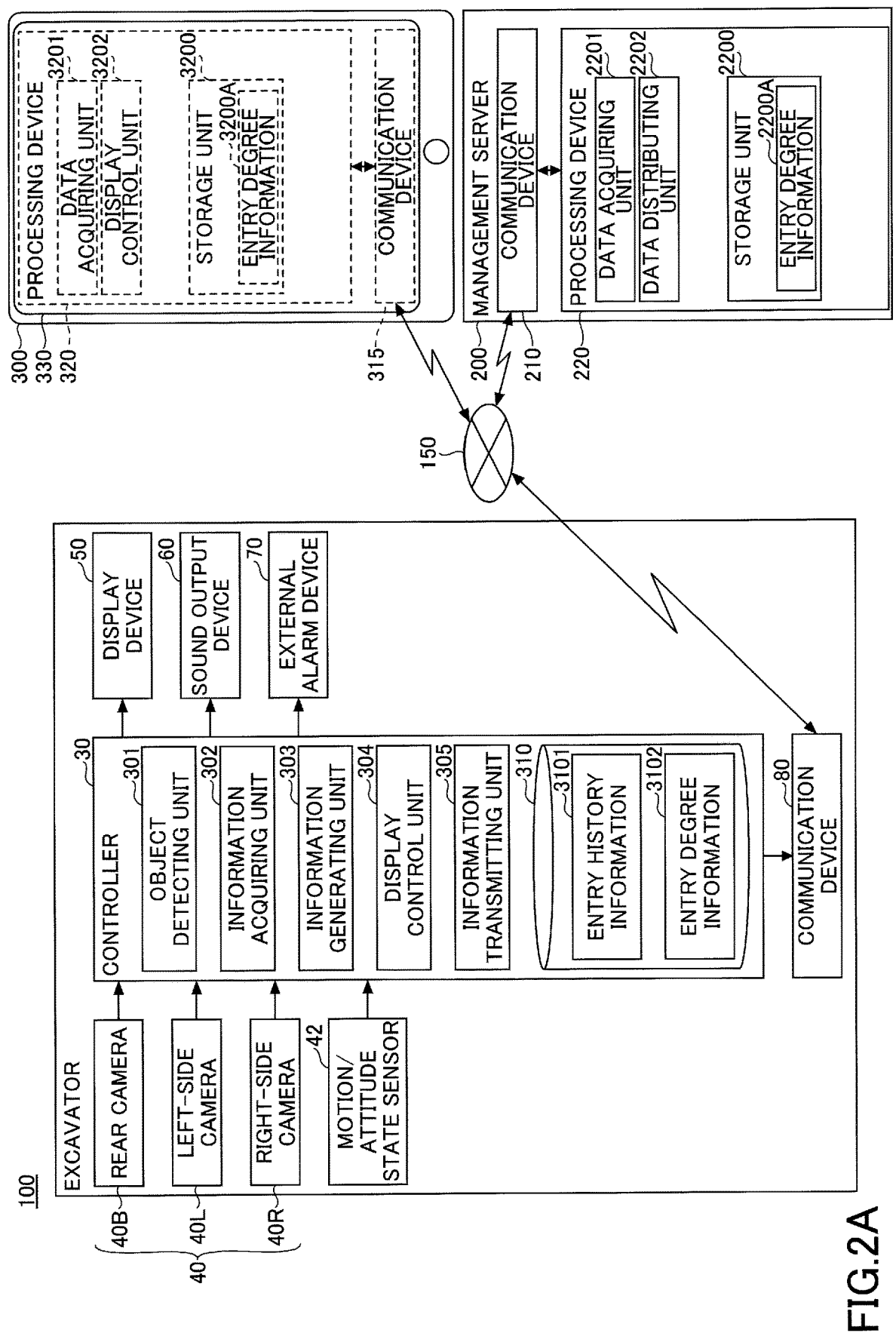
FIG. 2A is a diagram illustrating an example of the configuration of a safety management system according to an embodiment of the present invention.

First, FIG. 2A is a block diagram illustrating an example of the configuration of the safety management system 100 according to an embodiment.

The safety management system 100 includes an excavator, the management server 200 communicably connected to the excavator through the communication network 150, and a management terminal 300 capable of communicating with the management server 200 through the communication network 150.

The excavator includes the controller 30, the imaging device 40, the motion/attitude state sensor 42, the display device 50 and the like, as a configuration related to the safety management system 100 according to an embodiment.

The controller 30 performs main control processing in the safety management system 100. The functions of the controller 30 may be implemented by any piece of hardware, any piece of software, or a combination thereof, and may be mainly configured of a microcomputer including, for example, a CPU, a RAM, a ROM, an I/O, and the like. The controller 30 includes functional units implemented by executing, on the CPU, various programs stored in the ROM or the like; the functional units include an object detecting unit 301, an information acquiring unit 302, an information generating unit 303, the display control unit 304, and an information transmitting unit 305. The controller 30 also includes a storage unit 310 as a storage area defined in an internal memory such as an EEPROM (Electrically Erasable Programmable Read-Only Memory).

The imaging device 40 includes the rear camera 40B, the left-side camera 40L, and the right-side camera 40R, as described above. The rear camera 40B, the left-side camera 40L, and the right-side camera 40R are attached at the upper part of the upper turning body 3 so that the optical axis is directed obliquely downward, and have an imaging range (field angle) in the vertical direction including an area extending from the ground near the excavator to a faraway location from the excavator. The rear camera 40B, the left-side camera 40L, and the right-side camera 40R output captured images to the controller 30 at every predetermined cycle (for example, 1/30 seconds) during the operation of the excavator, and the captured images are taken into the controller 30.

The motion/attitude state sensor 42 includes the boom angle sensor 42A, the arm angle sensor 42B, the bucket angle sensor 42C, the IMUs 42D and 42E, the turning angle sensor 42F, and the acceleration sensor 42G as described above. Each sensor included in the motion/attitude state sensor 42 outputs a detection result (detection signal) to the controller 30, and the detection result is taken into the controller 30.

The display device 50 displays a captured image (through image) captured by the imaging device 40 or a surrounding image generated by the controller 30 based on a captured image captured by the imaging device 40 (for example, a viewpoint-converted image such as a bird's eye view viewed from directly above the excavator), etc. Furthermore, the display device 50 displays information representing the entry degree of a person into a predetermined area around the excavator (hereinafter, referred to as "entry degree information"), under control of the controller 30 (the display control unit 304 to be described later). Details of the entry degree information will be described later.

The sound output device 60 outputs an alarm sound under the control of the controller 30 (the object detecting unit 301).

The external alarm device 70 outputs an alarm toward the surrounding area of the excavator, by using lighting of a light source, blinking of the light source, an information image, sound, and the like, under control of the controller 30 (the object detecting unit 301).

The communication device 80 communicably connects with the management server 200 provided remotely from the excavator via the communication network 150 under the control of the controller 30, and transmits and receives various kinds of information with the management server 200.

The object detecting unit 301 (an example of a detecting unit) detects a predetermined monitor target within a predetermined area around the excavator, for example, within a predetermined distance D1 (for example, 5 meters) from the excavator, based on a captured image captured by the imaging device 40. That is, the object detecting unit 301 detects the entry of a monitor target into a predetermined area around the excavator (within the predetermined distance D1 from the excavator). A monitor target is an obstacle that may exist in or that may enter into an area around the excavator. For example, the monitor target may include a person such as a worker around the excavator, another work machine or a vehicle performing work around the excavator, and a work material temporarily placed around the excavator, and the like. In an embodiment, the following description will be made on the assumption that the monitor target is a person such as a worker.

For example, the object detecting unit 301 can recognize a person in a captured image by applying any of various kinds of known image processing methods, machine learning-based classifiers, etc., and identify the actual position of the recognized person (the distance D from the excavator to the recognized person, etc.).

The object detecting unit 301 detects a person around the excavator, based on the captured image captured by the imaging device 40. However, instead of or in addition to the captured image captured by the imaging device 40, a person around the excavator may be detected based on detection results (distance image, etc.) obtained by another sensor such as a millimeter wave radar, LIDAR (Light Detection And Ranging), and a stereo camera or the like. In this case, any of these other sensors is provided in the excavator.

Furthermore, when the object detecting unit 301 detects a person within a predetermined distance D1 from the excavator, the object detecting unit 301 causes the sound output device 60 such as a speaker in the cabin 10 to output an alarm sound or causes the display device 50 to display predetermined alarm information, to alarm the operator. At this time, the object detecting unit 301 changes the specification of the alarm, depending on whether a person is entering a first area that is in close contact with the excavator in a predetermined area around the excavator (for example, an area that is less than or equal to a predetermined distance D2 (for example, 2.5 m) from the excavator that is shorter than a predetermined distance D1 from the excavator), or a person is entering a second area that is farther away than the first area. Specifically, when the distance of the detected person from the excavator is less than or equal to the predetermined distance D1 and greater than the predetermined distance D2, the object detecting unit 301 determines the state as a caution state, and gives a preliminary alarm whose alarm level is low (for example, the sound output device 60 is caused to output an alarm sound with a relatively low volume). Furthermore, when the distance of the detected person from the excavator is less than or equal to the predetermined distance D2, the object detecting unit 301 determines the state as a warning state, and gives a formal alarm whose alarm level is high (for example, the sound output device 60 is caused to output an alarm sound with a relatively high volume).

Furthermore, after the output of the alarm is started, the object detecting unit 301 stops (cancels) the output of the alarm based on a predetermined condition. For example, the object detecting unit 301 may stop the output of the alarm when a person is not detected any longer in a predetermined area. Furthermore, after the output of the alarm is started, the object detecting unit 301 may stop the output of the alarm, when the operator performs a predetermined operation (alarm cancellation operation). Furthermore, after the output of the alarm is started, the object detecting unit 301 may stop the output of the alarm, when a predetermined time has elapsed; the predetermined time being the time taken for prompting the operator to confirm safety or the time taken to prompt a worker around the excavator to evacuate.

Furthermore, when the object detecting unit 301 detects a person within the predetermined distance D1 from the excavator, the object detecting unit 301 may cause the external alarm device 70 to output an alarm sound or may display predetermined alarm information, to give an alarm directed to the surroundings of the excavator. At this time, similar to the case of alarming the operator, the object detecting unit 301 may change the alarm level in accordance with the distance from the excavator to the detected person. Furthermore, the object detecting unit 301 may stop the started alarm in the same manner as in the case of the alarm to the operator.

Furthermore, when the object detecting unit 301 detects a person within a predetermined distance D3 (≤D1) from the excavator, the object detecting unit 301 may limit the motions of various motion elements of the excavator (for example, the lower traveling body 1, the upper turning body 3, the boom 4, the arm 5, the bucket 6 and the like). Hereinafter, limiting the motions of various motion elements of the excavator is simply referred to as "motion limitation of the excavator". In this case, the predetermined distance D3 may be the same as the predetermined distance D1 or the predetermined distance D2, or may be different from the predetermined distance D1 and the predetermined distance D2. Furthermore, the object detecting unit 301 may change the degree of limitation in accordance with the distance from the excavator to the detected person. For example, when the distance from the excavator to a detected person is less than or equal to a predetermined distance D3 and longer than a predetermined distance D4 (<D3), the object detecting unit 301 may make the motion speed moderate with respect to the operation state of each of the various motion elements. Furthermore, when the distance from the excavator to the detected person is less than or equal to the predetermined distance D4, the object detecting unit 301 may stop the various motion elements regardless of the operation state of each of the various motion elements. In this case, the predetermined distance D4 may be the same as or different from the predetermined distance D2.

Note that the object detecting unit 301 operates, for example, a pressure reducing valve or a switching valve provided on a pilot line between a hydraulic operating device that operates the various motion elements and a hydraulic actuator that drives the various motion elements. Accordingly, the pilot line can be depressurized or shut off to limit the motion of each of the various motion elements. Furthermore, the object detecting unit 301 operates the pressure reducing valve or the switching valve provided on the pilot line that transfers the pressure reduction to the hydraulic operating device, for example, and depressurizes or shuts off the pilot line so that the motion of each of the various motion elements can be limited.

Furthermore, after the start of the motion limitation of the excavator, the object detecting unit 301 cancels the motion limitation based on a predetermined condition. For example, when a person is not detected any longer within the predetermined distance D3 from the excavator, the object detecting unit 301 may cancel the motion limitation of the excavator. Furthermore, the object detecting unit 301 may cancel the motion limitation of the excavator when a predetermined operation (motion limitation cancelling operation) is performed by the operator. Furthermore, when a person is not detected any longer within the predetermined distance D3 from the excavator, and the motion limitation cancellation operation is performed by the operator, the object detecting unit 301 may cancel the motion limitation of the excavator.

Furthermore, the object detecting unit 301 includes a plurality of detecting units having mutually different detection ranges, and the performance for detecting a person who is a monitor target of each detecting unit (hereinafter simply referred to as "detection performance") may be changeable according to setting operation, etc., by the operator. For example, the object detecting unit 301 may include a rear detecting unit, a left-side detecting unit, and a right-side detecting unit for detecting a person from each of the captured images captured by the rear camera 40B, the left-side camera 40L, and the right-side camera 40R, respectively, and the object detecting unit 301 has a mode of being able to change the detection performance of each of the detecting units.

The detection performance may include one or more performance items. For example, the performance items related to detection performance may include the range in which the detecting unit is capable of detecting a person who is the monitor target (detection range), the detection accuracy, and the detection frequency per detection cycle (that is, the number of times of detecting a person who is the monitor target in the detection cycle), etc.

Figure 3:
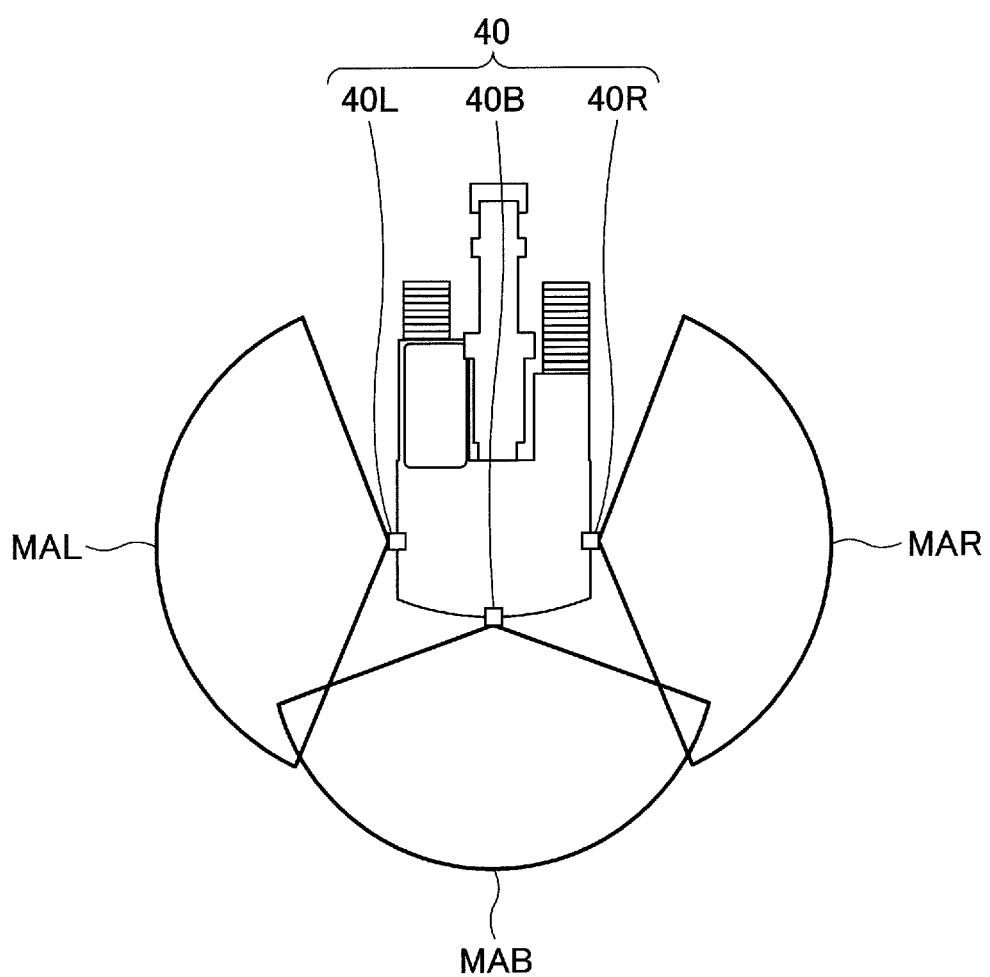
FIG. 3 is a diagram for describing a detection range by an object detecting unit according to an embodiment of the present invention.

For example, FIG. 3 is a diagram for describing the detection range of the object detecting unit 301.

As illustrated in FIG. 3, the object detecting unit 301 includes detection ranges MAB, MAL, and MAR corresponding to the rear camera 40B, the left-side camera 40L, and the right-side camera 40R, respectively. That is, the rear detecting unit, the left-side detecting unit, and the right-side detecting unit of the object detecting unit described above have the detection ranges MAB, MAL, and MAR, respectively.

Here, for example, when it is desired to widen the detection range MAB, the processing resources of the controller 30 are limited, and in order to complete the detection processing of the entire object detecting unit 301 within a predetermined processing time, there is a need to narrow other detection ranges MAL, MAR, or to reduce the other detection performances (detection accuracy, detection frequency) of the rear detecting unit, the left-side detecting unit, or the right-side detecting unit.

Thus, the object detecting unit 301 increases a certain performance item related to the detection performance of one detecting unit, within the range of resources of the controller 30, according to a setting operation by the operator, and instead, the object detecting unit 301 reduces the detection performance of another detecting unit or other detecting units, thereby attaining a trade-off, in changing the detection performance.

The information acquiring unit 302 acquires information related to various states (motion state, control state, etc.) of the excavator, from various sensors mounted on the excavator (for example, the imaging device 40, the motion/attitude state sensor 42, etc.), various actuators (for example, an electromagnetic valve, etc., that performs hydraulic pressure control), and various control devices (for example, the controller 30, etc.).

For example, when the object detecting unit 301 detects the entry of a person into a predetermined area around the excavator, the information acquiring unit 302 stores, as entry history information 3101 in the storage unit 310, various kinds of information (entry related information described later) at the time when the person enters the predetermined area, in association with the present entry of the person into the predetermined area. The entry history information 3101 will be described below with reference to FIG. 4.

FIG. 4 is a diagram illustrating an example of the entry history information 3101. The entry history information 3101 is an example of the history of the detection result obtained by a person detecting unit, and as described later, this is an example of the history of the alarm output result by the sound output device 60 (the distinction between an alarm according to a caution state and an alarm according to a warning state). The entry history information 3101 is historically updated by the information generating unit 303, each time the object detecting unit 301 detects the entry of a person into a predetermined area around the excavator.

As illustrated in FIG. 4, the entry history information 3101 is stored in the storage unit 310 as data in a table format. The entry history information 3101 includes, as various kinds of information at the time when a person enters a predetermined area, information on the detected date and time (date, day of week, time of day), information on the detection location, information on the alarm level, information on the subsequent action of the detected person, information on the operation state at the time of detection, information on the work mode at the time of detection, and image information at the time of detection (detection time image information). That is, various kinds of information at the time of the entry of a person into the predetermined area, are information (hereinafter referred to as "entry related information") related to (influencing) the entry of a person into the predetermined area. The entry related information is acquired by the information acquiring unit 302.

The detection location indicates which one of a plurality of areas divided in advance in a predetermined area, in which a person's entry is detected, and in this example, one of three areas of left, right, and rear areas around the excavator, is indicated as the area where the person's entry has been detected.

The detection location may not be relative position information with respect to the excavator, but may be absolute position information such as GPS position information. In this case, the excavator is provided with a communication device that communicates with a GPS sensor carried by a worker (for example, attached to a helmet). Accordingly, the controller 30 can receive GPS position information when a person is detected by the object detecting unit 301, from the GPS sensor carried by the worker, through the communication device.

The alarm level indicates, as described above, either one of a warning state in which entry of a person is detected by the object detecting unit 301 in a first area (an area that is less than or equal to the predetermined distance D2 from the excavator), or a caution state in which entry of a person is detected by the object detecting unit 301 in a second area (an area that is greater than the predetermined distance D2 and less than or equal to the predetermined distance D1 from the excavator).

The subsequent action of the detected person indicates "evacuated from the predetermined area" or "continued to stay in the predetermined area", at the time point when a predetermined time (for example, one minute) has elapsed after the object detecting unit 301 detects the entry of the person into the predetermined area.

The operation state at the time of detection indicates the operation state of the excavator by the operator when entry of a person into the predetermined area is detected by the object detecting unit 301, and in this example, the operation state indicates at least one of a traveling state in which the lower traveling body 1 is operated; a turning state in which the upper turning body 3 is operated; and a working state in which the work machine (the boom 4, the arm 5, and the bucket 6) is operated, or a state where the excavator is not operated.

The work mode at the time of detection indicates any one of a plurality of work modes corresponding to the set rotational speed of the engine operated at a constant rotational speed, and in this example, any one of a SP (Super Power) mode in which the set rotational speed of the engine is relatively high and the work speed is prioritized, a H (Heavy) mode that is suitable for heavy work in which the set rotational speed of the engine is approximately medium and the work load is relatively high, and an A (Auto) mode corresponding to a wide range of work in which the set rotational speed of the engine is relatively low.

The image information is a captured image captured by the imaging device 40 when the object detecting unit 301 detects entry of a person into a predetermined area. In each of the columns of image information in the entry history information 3101 that is data in a table format, an identifier for identifying image information (for example, AAA, BBB, CCC, . . . , JJJ in the figure) is stored, and based on the identifier, it is possible to access the image information stored in the storage unit 310.

The entry history information 3101 may be in a mode of including at least a part of the above-described entry related information illustrated in one example of FIG. 4, or instead of or in addition to the above-described entry related information, the entry history information 3101 may be entry related information other than the above-described entry related information, that is, the entry history information 3101 may be in a mode of including at least part of the information indicated below.

For example, the entry history information 3101 may include, as an example of the entry related information, information (work content information) related to the content of the work performed by the excavator when the object detecting unit 301 detects entry of a person into the predetermined area. At this time, the information generating unit 303 may determine the work content based on, for example, a captured image captured by a front camera that is mounted on the excavator and that captures images in front of the excavator, and a driving state of a hydraulic actuator that drives each of the various motion elements (for example, the pressure state in an oil chamber of the hydraulic actuator). The work content to be the target of determination may include, for example, digging and loading work, mound striking work, and the like.

Furthermore, for example, the entry history information 3101 may include, as an example of the entry related information, information (motion limitation information) on the presence or absence of the limitation of a motion element of the excavator and the limitation degree, when the object detecting unit 301 detects the entry of a person into the predetermined area.

Furthermore, for example, the entry history information 3101 may include, as an example of the entry related information, information (alarm time information) on the elapsed time from the start of the output of the alarm when the object detecting unit 301 detects the entry of a person into the predetermined area to the stop of output of the alarm (alarm cancellation) based on an alarm cancellation operation by the operator. Furthermore, similarly, the entry history information 3101 may include information (motion limitation time information) on the elapsed time from the start of the motion limitation when the motion limitation of the excavator is performed due to the object detecting unit 301 detecting the entry of a person into an area that is within the predetermined distance D3 from the excavator, to when the motion limitation is cancelled based on a motion limitation cancellation operation by the operator.

Furthermore, for example, the entry history information 3101 may include, as an example of entry related information, information (detection performance set information) on the set state of the detection performance of each of a plurality of detecting units having different detection ranges from each other, included in the object detecting unit 301, when the object detecting unit 301 detects entry of a person into a predetermined area from the excavator.

Furthermore, for example, the entry history information 3101 may include, as an example of entry related information, information (detection time surrounding environment information) on the surrounding environment that may affect the detection performance of the object detecting unit 301. The surrounding environment information may include, for example, the type of weather, the temperature state, the visibility state (presence or absence of fog or haze, etc.), the type of time period (for example, distinction of morning, day, and night).

Furthermore, for example, the entry history information 3101 may include, as an example of entry related information, information (attitude stability information) on the attitude stability of the excavator when the object detecting unit 301 detects entry of a person into a predetermined area. The attitude stability of the excavator is, for example, an index indicating whether the excavator is in a motion/attitude state that does not cause an inadvertent motion unintended by the operator. An inadvertent motion of the excavator unintended by the operator includes, for example, a falling motion of losing balance and falling over, a lifting-up motion or a sliding motion in which a part of the lower traveling body 1 of the excavator lifts up or slips backward and forward due to an excavating reaction force, etc. For example, the information acquiring unit 302 can calculate a predetermined attitude stability based on, for example, a calculation formula based on a predetermined dynamic model or the like or a map, based on the detection result of the motion/attitude state sensor 42.

Furthermore, for example, the entry history information 3101 may include, as an example of the entry related information, information (operation capacity information) on the operation skill of the operator of the excavator (for example, the operation skill within the latest predetermined period), when the object detecting unit 301 detects entry of a person into a predetermined area. The operation capacity information may include, for example, the fuel efficiency of the excavator (specifically, the engine that is the power source), the amount of work according to a predetermined standard per unit time, the frequency of so-called hydraulic pressure relief of the excavator, and the like.

Furthermore, for example, the entry history information 3101 may include, as an example of the entry related information, information (motion limitation time operation information) on the operation state of the excavator operated by the operator when the motion of the excavator is limited, due to the object detecting unit 301 detecting the entry of a person into an area that is within the predetermined distance D3 from the excavator. Similar to the information of the operation state at the time of detection described above, the motion limitation time operation information includes at least one of a traveling state in which the lower traveling body 1 is operated; a turning state in which the upper turning body 3 is operated; and a working state in which the work machine (the boom 4, the arm 5, and the bucket 6) is operated, or a state where the excavator is not operated.

The information generating unit 303 generates entry degree information 3102 based on the entry history information 3101 updated by the information acquiring unit 302 each time the object detecting unit 301 detects entry of a person into a predetermined area. Specifically, the information generating unit 303 generates the entry degree information 3102 by statistically processing the entry history information 3101. Then, the information generating unit 303 stores the generated entry degree information 3102 in the storage unit 310. Details of the entry degree information 3102 will be described later.

The display control unit 304 causes the display device 50 to display various information images. For example, when a predefined report condition is satisfied, the display control unit 304 causes the display device 50 to display the entry degree information 3102 generated by the information generating unit 303. Details of processing by the display control unit 304 will be described later.

The display control unit 304 may cause the display device 50 to display the entry degree information 3102 generated by the information generating unit 303, in accordance with a predetermined operation by the operator.

When the predefined report condition is satisfied, the information transmitting unit 305 controls the communication device 80, and transmits the entry degree information 3102 generated by the information generating unit 303 to the management server 200. Details of processing by the information transmitting unit 305 will be described later.

The management server 200 (an example of a management apparatus) performs various kinds of management of the excavator based on various kinds of information transmitted from the excavator. The management server 200 is communicably connected to the excavator (the communication device 80) via the communication network 150, and receives various kinds of information transmitted from the excavator. For example, the management server 200 receives, from the excavator, information on the safety situation of the work site including the excavator (for example, the entry degree information described later), and transmits the information to a computer terminal used by a supervisor or a worker of the work site, a mobile terminal of the supervisor at the work site, other work machines at the work site, etc. Accordingly, the supervisor and the workers at the work site, and the operators of other work machines, etc., can recognize the safety situation of the work site, and can be prompted to take safety actions.

The management server 200 includes a communication device 210 and a processing device 220.

The communication device 210 may be any communication device for performing bidirectional communication with each of the excavator and the management terminal 300 through the communication network 150.

The processing device 220 performs various control processes in the management server 200. The function of the processing device 220 may be implemented by any piece of hardware, any piece of software, or a combination thereof, and may be mainly configured of one or more server computers including, for example, a CPU, a RAM, a ROM, an auxiliary storage device, a predetermined communication interface, and the like. The processing device 220 includes functional units implemented by executing one or more programs stored in the ROM or the auxiliary storage device, the functional units including a data acquiring unit 2201 and a data distributing unit 2202. The processing device 220 also includes a storage unit 2200 implemented as a storage area in the auxiliary storage device of the server computer, and the processing of saving (storing) various kinds of data in the storage unit 2200 is implemented by a predetermined program stored in the ROM or the auxiliary storage device.

The data acquiring unit 2201 acquires the entry degree information transmitted from the excavator to the management server 200 through the communication device 210. The data acquiring unit 2201 stores the acquired entry degree information in the storage unit 2200 (entry degree information 2200A).

The data distributing unit 2202 controls the communication device 210 according to a request from a mobile terminal or according to a requirement of a push notification defined in advance, and distributes the entry degree information 2200A to the management terminal 300.

The data distributing unit 2202 may distribute the entry degree information 2200A to devices other than the management terminal 300, such as a work machine communicably connected to the management server 200 (another work machine on the same work site other than the excavator that is the transmission source of the entry degree information), for example, an excavator or a bulldozer or the like.

The management terminal 300 is any terminal that is communicably connected to the management server 200, and the management terminal 300 can be used by a supervisor who manages the work site where the excavator is used for performing work or a worker who actually performs the work to view various kinds of information displayed on the display unit such as a display. The management terminal 300 may be, for example, a desktop terminal fixed in a building temporarily installed at a work site. Furthermore, the management terminal 300 may be a mobile terminal such as a mobile phone, a smartphone, a tablet terminal or the like, possessed by a supervisor or a worker at the work site.

The management terminal 300 includes a communication device 315, a processing device 320, and a touch panel type display 330.

The communication device 315 is any device that communicates with the management server 200 and the like through the communication network 150. The communication device 315 is, for example, a mobile communication module compatible with communication standards such as Long Term Evolution (LTE), 4G (4th Generation), 5G (5th Generation), and the like.

The processing device 320 performs various control processes in the management terminal 300. The functions of the processing device 320 may be implemented by any piece of hardware, any piece of software, or a combination thereof, and may be mainly configured of a computer including, for example, a CPU, a RAM, a ROM, an auxiliary storage device, a predetermined communication interface, and the like. The processing device 320 includes functional units implemented by executing, on the CPU, one or more programs stored in, for example, the ROM or the auxiliary storage device, the functional units including a data acquiring unit 3201 and a display control unit 3202. The processing device 320 also includes, for example, a storage unit 3200 implemented as a storage area in the auxiliary storage device, and the and processing of saving (storing) various kinds of data in the storage unit 3200 is implemented by a predetermined program stored in the ROM or the auxiliary storage device.

For example, the functions of the data acquiring unit 3201 and the display control unit 3202 may have a mode of being executable, for example, by activating an application program (hereinafter referred to as "management app") installed in the auxiliary storage device of the processing device 320 or the like.

The data acquiring unit 3201 acquires various kinds of data, specifically, the entry degree information from the management server 200 through the communication device 315 according to a predetermined condition. The data acquiring unit 3201 stores the acquired entry degree information in the storage unit 3200 (entry degree information 3200A).

For example, the data acquiring unit 3201 controls the communication device 315 according to a predetermined operation by the user of requesting display of the entry degree information, and transmits a distribution request to the management server 200, to acquire the entry degree information from the management server 200. At this time, the operation with respect to the management terminal 300 by the user may be, for example, an operation by software using a touch panel on a predetermined GUI (Graphical User Interface) displayed on the display 330 in conjunction with the operation of the management app, or an operation with respect to an operation unit or the like by hardware installed in or attached to the management terminal 300. Hereinafter, the same applies to other operations in the management terminal 300.

Furthermore, for example, the data acquiring unit 3201 may acquire the entry degree information distributed from the management server 200, in accordance with the requirement of a predetermined push notification.

The display control unit 3202 causes the display 330 to display the entry degree information 3200A. Accordingly, even when the user is not in the excavator, the user can confirm the entry degree information related to the safety environment of the work site, and, therefore, for example, this information can be used for confirmation of the safety situation or site management (for example, analysis of near miss) on a later date.

For example, the display control unit 3202 may display the entry degree information 3200A on the display 330 according to a predetermined operation by the user.

Furthermore, for example, when the entry degree information is distributed from the management server 200 in the form of a push notification, the display control unit 3202 may cause the display 330 to display the entry degree information when the entry degree information is acquired by the data acquiring unit 3201. At this time, the display control unit 3202 may cause the display 330 to display the entry degree information as a pop-up display, or may cause the display 330 to display the digest version of the entry degree information.

Hereinafter, details of the display mode of the entry degree information displayed on the display 330 by the function of the display control unit 3202 will be described later (see FIG. 13).

Note that in the present example (FIG. 2A), the entry degree information is generated by the controller 30 of the excavator, but the entry degree information may be generated by the management server 200 or the management terminal 300. That is, the function of the information generating unit 303 may be transferred to the management server 200 or the management terminal 300.

Figure 2B:
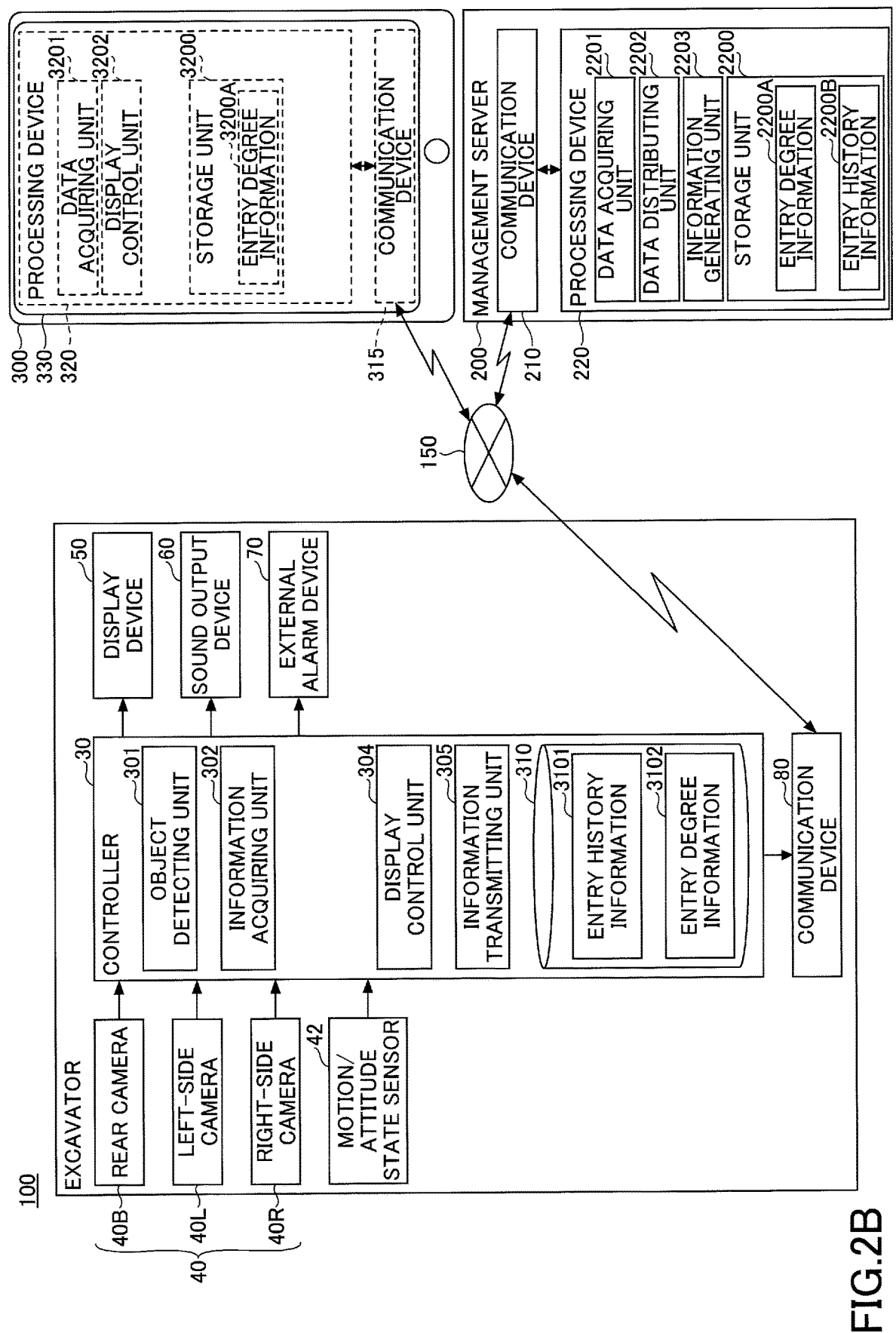
FIG. 2B is a diagram illustrating another example of the configuration of the safety management system according to an embodiment of the present invention.

For example, FIG. 2B is a block diagram illustrating another example of the configuration of the safety management system 100 according to an embodiment.

In the present example, the information generating unit 303 of the excavator (controller 30) is omitted, and instead, an information generating unit 2203 is added to the processing device 220 of the management server 200.

Specifically, the information transmitting unit 305 of the controller 30 controls the communication device 80 and transmits the entry history information 3101 to the management server 200.

The data acquiring unit 2201 of the management server 200 acquires the entry history information transmitted from the excavator to the management server through the communication device 210 and stores the acquired entry history information in the storage unit 2200 (entry history information 2200B).

Then, as in the case of the information generating unit 303 of FIG. 2A, the information generating unit 2203 of the management server 200 generates entry degree information based on the entry history information 2200B and stores the generated entry degree information in the storage unit 2200 (entry degree information 2200A).

Accordingly, the management server 200 can distribute the entry degree information generated by the management server 200 itself to the management terminal 300 through the communication device 210. Furthermore, the management server 200 can distribute the entry degree information to the excavator that is the transmission source of the entry history information through the communication device 210. Furthermore, centralized management can be performed by the management server 200, and, therefore, the configuration of the excavator can be simplified, and an increase in the cost and the like of the excavator can be suppressed.

Figure 2C:
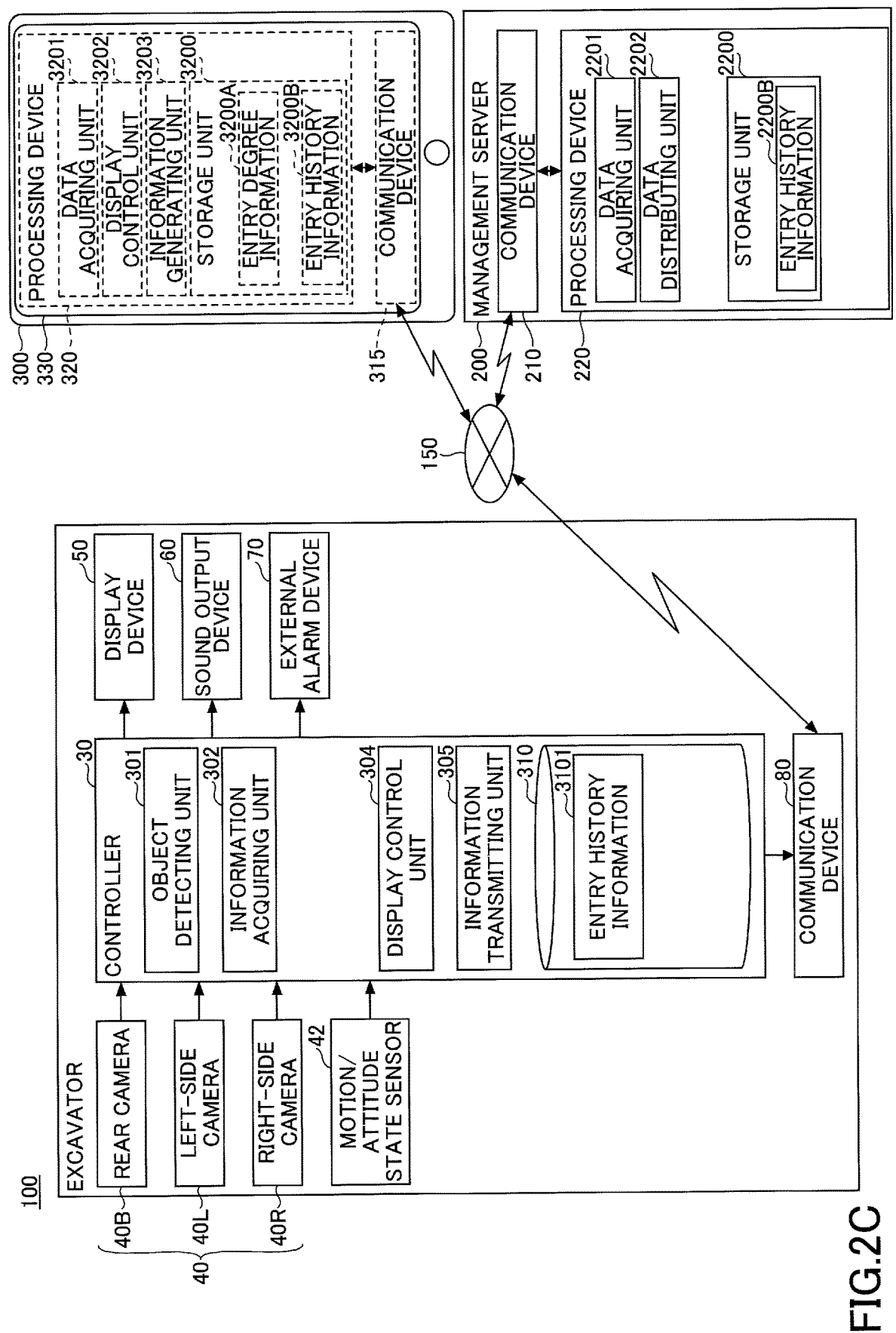
FIG. 2C is a diagram illustrating still another example of the configuration of the safety management system according to an embodiment of the present invention.

Furthermore, for example, FIG. 2C is a block diagram illustrating still another example of the configuration of the safety management system 100 according to an embodiment.

In this example, the information generating unit 303 of the excavator (controller 30) is omitted, and instead, an information generating unit 3203 is added to the processing device 320 of the management terminal 300.

Specifically, the information transmitting unit 305 of the controller 30 controls the communication device 80 and transmits the entry history information 3101 to the management server 200.

The data acquiring unit 2201 of the management server 200 acquires the entry history information transmitted from the excavator to the management server through the communication device 210 and stores the acquired entry history information in the storage unit 2200 (entry history information 2200B).

The data distributing unit 2202 of the management server 200 controls the communication device 210 according to a request from the management terminal 300 or according to a requirement of the push notification defined in advance, and distributes the entry history information 2200B to the management terminal 300.

The data acquiring unit 3201 of the management terminal 300 acquires the entry history information 2200B to be distributed from the management terminal 300 through the communication device 315, and stores the acquired entry history information 2200B in the storage unit 3200 (entry history information 3200B).

The information generating unit 3203 of the management terminal 300 generates entry degree information based on the entry history information 3200B, similar to the information generating unit 303 of FIG. 2A, according to a predetermined timing (for example, a timing immediately after acquisition of the entry history information 2200B by the data acquiring unit 3201, a timing of predetermined batch processing, etc.), or according to a predetermined operation or the like corresponding to a request to display the entry degree information by the user, and stores the generated entry degree information in the storage unit 3200 (entry degree information 3200A).

Accordingly, the management terminal 300 can acquire entry history information from the management server 200, can generate the entry degree information by itself, and can cause the display 330 to display the generated entry degree information.

[Details of Entry Degree Information]

Next, referring to FIGS. 5 to 11, the entry degree information (the entry degree information 3102, 2200A, and 3200A) generated by the information generating units 303, 2203, and 3203 (hereinafter referred to as "information generating unit 303, etc." as a matter of convenience) will be described.

First, FIG. 5 is a diagram illustrating a first example of the entry degree information generated by the information generating unit 303, etc.

As illustrated in FIG. 5, the entry degree information according to this example is information in a table format representing the number of times of detecting entry of a person into a predetermined area within the latest predetermined time (in this example, 1 hour between 11:00 and 12:00), the number of persons detected (number of persons detected), and as additional information, image information of each time entry of a person into a predetermined area is detected (captured image captured by the imaging device 40).

Although the entry degree information in this example includes both the number of times detected (number of detections) and the number of persons detected, only either one of these pieces of information may be included. Furthermore, the entry degree information in this example may include the number of times the motion of the excavator is limited (number of times of motion limitation) instead of or in addition to the number of times detected. Hereinafter, the same applies to the examples of entry degree information described later including those illustrated in FIGS. 6 to 10 (second example to sixth example).

The number of times detected includes the total number of times detected (total number of detections) within a predetermined time, and also the number of times detected per alarm level at the time of detection (distinction between caution state and warning state), the number of times detected per operation state at the time of detection (distinction between travelling state and non-travelling state, distinction between turning state and non-turning state, distinction between working state and non-working state), and the number of times detected per work mode at the time of detection (distinction of SP mode, H mode, and A mode). Furthermore, instead of or in addition to at least a part of the above contents, the number of times detected may include the number of times detected per work content at the time of detection, the number of times detected per elapsed time from alarm start to alarm cancellation based on an alarm cancellation operation by the operator (for example, in one-minute intervals), the number of times detected per detection performance setting state at the time of detection, the number of times detected per surrounding environment at the time of detection, the number of times detected per attitude stability of the excavator at the time of detection, and the number of times detected per operation skill level of the operator at the time of detection. Hereinafter, the same applies to the examples of entry degree information described later including those illustrated in FIGS. 5 to 9 (second example to fifth example).

When the entry degree information of this example includes the number of times of motion limitation, the number of times of motion limitation includes the total number of times of motion limitation within the predetermined time, and also the number of times of motion limitation per degree of motion limitation, the number of times of motion limitation per operation state at the time of motion limitation, and the number of times of motion limitation per work mode at the time of motion limitation. Furthermore, the number of times of motion limitation may include the number of times of motion limitation per elapsed time from motion limitation start to motion limitation cancellation based on a motion limitation cancellation operation by the operator, the number of times of motion limitation per detection performance setting state at the time of detection (at the time of motion limitation), and the number of times of motion limitation per surrounding environment at the time of detection (at the time of motion limitation) and the like.

Furthermore, the number of persons detected includes the total number of persons detected within a predetermined time, and also the number of persons detected per detection location, and the number of persons detected per subsequent action.

Furthermore, the additional information includes link information (link 1 to link 10 in the drawing) for accessing the image information of each time of detection.

Next, FIG. 6 is a diagram illustrating a second example of the entry degree information generated by the information generating unit 303.

As illustrated in FIG. 6, the entry degree information according to this example is information in a table format representing the number of times of detecting the entry of a person into a predetermined area at a predetermined detection location (in this example, the rear area of the excavator), the number of persons detected (number of persons detected), and as additional information, image information of each time entry of a person into a predetermined area is detected (captured image captured by the imaging device 40).

The number of times detected includes the total number of times detected at a detection location, and also the number of times detected per time period of the current day, the number of times detected per alarm level at the time of detection (distinction between caution state and warning state), the number of times detected per operation state at the time of detection (distinction between travelling state and non-travelling state, distinction between turning state and non-turning state, distinction between working state and non-working state), and the number of times detected per work mode at the time of detection (distinction of SP mode, H mode, and A mode).

Furthermore, the number of persons detected includes the total number of persons detected within a predetermined time, and also the number of persons detected per subsequent action.

Furthermore, the additional information includes link information (link 1 to link 10 in the drawing) for accessing the image information of each time of detection, similar to the first example.

Next, FIG. 7 is a diagram illustrating a third example of the entry degree information generated by the information generating unit 303.

As illustrated in FIG. 7, the entry degree information according to this example is information in a table format representing the number of times of detecting entry of a person into a predetermined area in a predetermined operation state (in this example, the turning state), the number of persons detected (number of persons detected), and as additional information, image information of each time entry of a person into a predetermined area is detected (captured image captured by the imaging device 40).

The number of times detected includes the total number of times detected in a predetermined operation state, and also the number of times detected per time period of the current day, the number of times detected per alarm level at the time of detection (distinction between caution state and warning state), and the number of times detected per work mode at the time of detection (distinction of SP mode, H mode, and A mode).

Furthermore, the number of persons detected includes the total number of persons detected at a predetermined detection location, and also the number of persons detected per detection location, and the number of persons detected per subsequent action.

Furthermore, the additional information includes link information (link 1 to link 10 in the drawing) for accessing the image information of each time of detection, similar to the first example.

Next, FIG. 8 is a diagram illustrating a fourth example of the entry degree information generated by the information generating unit 303.

As illustrated in FIG. 8, the entry degree information according to this example is information in a table format representing the number of times of detecting entry of a person into a predetermined area in a predetermined work mode (in this example, H mode), the number of persons detected (number of persons detected), and as additional information, image information of each time entry of a person into a predetermined area is detected (captured image captured by the imaging device 40).

The number of times detected includes the total number of times detected in a predetermined work mode, and also the number of times detected per time period of the current day, the number of times detected per alarm level at the time of detection (distinction between caution state and warning state), and the number of times detected per operation state at the time of detection (distinction between travelling state and non-travelling state, distinction between turning state and non-turning state, distinction between working state and non-working state).

Furthermore, the number of persons detected includes the total number of persons detected in a predetermined work mode, and also the number of persons detected per detection location, and the number of persons detected per subsequent action.

Furthermore, the additional information includes link information (link 1 to link 10 in the drawing) for accessing the image information of each time of detection, similar to the first example.

Next, FIG. 9 is a diagram illustrating a fifth example of the entry degree information generated by the information generating unit 303.

As illustrated in FIG. 9, the entry degree information according to this example is information in a table format representing the number of times of detecting entry of a person into a predetermined area at a predetermined alarm level (in this example, a warning state), the number of persons detected (number of persons detected), and as additional information, image information of each time entry of a person into a predetermined area is detected (captured image captured by the imaging device 40).

The number of times detected includes the total number of times detected at a predetermined alarm level, and also the number of times detected per time period of the current day, the number of times detected per alarm level at the time of detection (distinction between caution state and warning state), the number of times detected per operation state at the time of detection (distinction between travelling state and non-travelling state, distinction between turning state and non-turning state, distinction between working state and non-working state), and the number of times detected per work mode at the time of detection (distinction of SP mode, H mode, and A mode).

Furthermore, the number of persons detected includes the total number of persons detected at a predetermined alarm level, and also the number of persons detected per detection location, and the number of persons detected per subsequent action.

Furthermore, the additional information includes link information (link 1 to link 10 in the drawing) for accessing the image information of each time of detection, similar to the first example.

As described above, in the first to fifth examples, the information generating unit 303, etc., generates entry degree information including the number of times detected, the number of persons detected, and the like. Specifically, the information generating unit 303, etc., generates entry degree information for generating a table by which it is possible to confirm the relationship between the entry degree of the monitor target (person) to a predetermined area around the excavator and the entry related information. Accordingly, the controller 30 (display control unit 304) of the excavator causes the display device 50 to display the generated entry degree information, and the operator can recognize the entry situation (entry degree) of the monitor target (person) to a predetermined area around the excavator. Furthermore, the management terminal 300 causes the display 330 to display the generated entry degree information so that the supervisor or a worker at the work site can recognize the entry situation of the monitor target (person) into the predetermined area around the excavator. Furthermore, the management server 200 can distribute the generated entry degree information not only to the management terminal 300 but also to another work machine different from the target work machine and display the information on a display device or the like of the other work machine. Therefore, not only the operator of the target work machine (excavator) but also the supervisor and the worker at the work site, the operator of another work machine, etc., can be made to recognize the entry situation (entry degree) of a person into a predetermined area around the excavator. Therefore, it becomes possible to prompt the operator of the excavator, the supervisor and the worker at the work site, and an operator of another work machine, etc., to take safety actions, so that the safety at the work site where the excavator is used is improved, by a mode having relatively immediate effects.

Furthermore, the entry degree information may include the number of times of motion limitation. Accordingly, it is possible to make the operator of the excavator and also the supervisor and the worker at the work site recognize how much the motion limitation of the excavator has occurred due to the entry of a person around the excavator.

In the first to fifth examples, the information generating unit 303, etc., generates entry degree information for generating a table by which it is possible to confirm the entry degree of the monitor target (person) into a predetermined area around the excavator under a predetermined condition regarding the entry degree information. That is, the information generating unit 303, etc., narrows down the entry related information according to a predetermined condition regarding the entry related information, and generates entry degree information for generating a table by which it is possible to confirm the entry degree into the predetermined area around the excavator, obtained by narrowing down the entry related information according to a predetermined condition. Specifically, the operator, etc., can recognize the number of times detected, the number of persons detected, and the number of times of motion limitation, etc., under each condition such as a predetermined time, a predetermined detection location, a predetermined operation state, a predetermined work mode, or a predetermined alarm level. Therefore, the operator, etc., can recognize the safety situation of the work site from various viewpoints according to the number of times detected, the number of persons detected, and the number of times of motion limitation, under various conditions. The operator, etc., can also compare the number of times detected and the number of times of motion limitation, etc., to thereby consider an action policy or the like for achieving both work efficiency of the work site and the safety of the work site.

Furthermore, for example, by the number of times detected per time period, the operator, etc., can recognize the increasing/decreasing tendency or the like of the number of times detected according to the elapsed time. Therefore, the operator, etc., can recognize, for example, a situation in which the number of times detected tends to increase, and can improve the safety of the work site by paying more attention to the surroundings.

Furthermore, for example, according to the number of times detected per alarm level, the operator, etc., can recognize the entry degree into a first area where the alarm level is high. Similarly, according to the number of times of motion limitation per degree of motion limitation, the operator, etc., can recognize the entry degree into the area where the degree of motion limitation is high, that is, the area closer to the excavator. Therefore, the operator can operate the excavator or perform work around the excavator upon recognizing the situation such as the likelihood of proximity of the worker to the excavator at the present work site, the operator, etc., thereby improving the safety of the work site.

Furthermore, for example, according to the number of times detected per operation state and the number of times detected per operation mode, the operator can recognize the type of operation state or work mode in which the operator has not been able to notice the entry of a person in advance. Therefore, in the future, in such an operation state or work mode, the operator, etc., can pay more attention, etc., thereby improving the safety of the work site.

Furthermore, according to the number of persons detected per detection location, the operator, etc., can recognize the area in the predetermined area for which the operator has not been able to notice the entry of a person in advance, or the operator, etc., can recognize the area where there are many entries in the situation of the present work site. Therefore, in such an area, the operator, etc., can pay more attention, etc., thereby improving the safety of the work site.

Furthermore, according to the number of times detected per subsequent action, it is possible to recognize the presence of a person (worker, etc.) who does not leave the predetermined area, because the operator, etc., does not take an appropriate action even after a predetermined time elapses after the object detecting unit 301 detects a person's entry into the predetermined area, and an alarm is output from the sound output device 60. Therefore, even if a person enters a predetermined area around the excavator, by prompting the operator, etc., to thoroughly take actions such as immediate evacuation from the predetermined area or stopping the operation of the excavator, etc., the safety of the work site can be improved.

Furthermore, for example, according to the number of times detected per work content at the time of detection, etc., the operator, etc., can recognize the kind of work content for which the operator has not been able to notice the entry of a person in advance, and the operator, etc., can recognize the kind of work content for which a person is likely to approach the surroundings of the excavator. Therefore, at the time of such a work content, the operator, etc., can pay more attention, etc., thereby improving the safety of the work site.

Furthermore, for example, according to the number of times detected per elapsed time from alarm start to alarm cancellation based on an alarm cancellation operation, etc., the operator, etc., can recognize the tendency of the elapsed time from alarm start to the operator's alarm cancellation operation. Similarly, according to the number of times of motion limitation per elapsed time from the start of motion limitation of the excavator to the cancellation of motion limitation of the excavator based on a motion limitation cancellation operation, etc., the operator, etc., can recognize the tendency of the elapsed time from the start of motion limitation of the excavator to the motion limitation cancellation operation, etc., by the operator. For example, when the time from the alarm start or the motion limitation start of the excavator to the alarm cancellation operation or the motion limitation cancellation operation is relatively short, the operator may not sufficiently confirm the surroundings of the excavator, and therefore, by causing the operator to thoroughly confirm the surroundings, etc., the safety of the work site can be improved.

Furthermore, for example, according to the number of times detected per setting state of detection performance at the time of detection, etc., the operator, etc., can recognize the setting state of detection performance in which the number of times detected is large, etc. Therefore, the operator, etc., can use this information for determining the setting state of detection performance at the work site, for example.

Furthermore, for example, according to the number of times detected per surrounding environment at the time of detection, etc., the operator, etc., can recognize the surrounding environment in which the operator has not been able to notice the entry of a person in advance, or the operator, etc., can recognize the surrounding environment in which a person is likely to approach the surroundings of the excavator. Therefore, in such a surrounding environment, the operator, etc., can pay more attention, etc., thereby improving the safety of the work site.

Furthermore, for example, according to the number of times detected per attitude stability at the time of detection, etc., the operator, etc., can confirm the correlation between the attitude stability and the entry degree of a person into a predetermined area around the excavator (for example, when the attitude stability decreases, the operator's attention to the operation increases, and conversely, the operator's attention to the surroundings of the excavator decreases, etc.). Thus, for example, according to the relationship between the decrease in the attitude stability of the excavator caused by the environment of the site (for example, whether the work site is an unstable location, whether there is a relatively large height difference in the motion of the bucket 6, whether there is a need to extend the attachment to a position that is relatively far away from the upper turning body 3, etc.) and the entry degree of a person, the site supervisor, etc., can consider measures for improving the safety of the work site in the future (such as environmental improvement).

Furthermore, for example, according to the number of times detected per operation skill of the operator at the time of detection, etc., the operator, etc., can confirm the correlation between the operation skill of the operator and the entry degree of a person into a predetermined area around the excavator (for example, as the operation skill is lower, the operator's attention to the operation increases, and conversely, the operator's attention to the surroundings of the excavator decreases, etc.). Therefore, the site supervisor, etc., can assign a skilled operator for work in a location where there are many workers working in the surroundings, in assigning the person in charge of a plurality of work machines.

Furthermore, according to the image information, the operator, etc., can recognize the specific form of entry to the predetermined area, etc., and, therefore, the operator, etc., can make a specific action policy, etc., for improving the safety in the future.

In the first to fifth examples, the entry degree information includes five pieces of information among the number of times detected per time period, the number of times detected per alarm level, the number of times detected per operation state, the number of times detected per work mode, the number of persons detected per detection location, and the number of persons detected per subsequent action; however, some of or all of these pieces of information may be omitted. Furthermore, in the first to fifth examples, when transmitting the entry degree information to the management server 200, the information transmitting unit 305 corresponding to the safety management system of FIG. 2A also transmits the image data corresponding to the link information with respect to image information of each time of detection in the entry degree information, to the management server 200. Furthermore, in the first to fifth examples, the image information (link information to the image information) is included as the additional information, but the image information may be omitted.

Next, FIG. 10 is a diagram illustrating a sixth example of the entry degree information generated by the information generating unit 303, etc.

As illustrated in FIG. 10, the entry degree information includes time-series data of the number of times of detecting the entry of a person into a predetermined area around the excavator and the number of persons detected (in this example, time-series data by day of the last week, and data of the present time at 10:30 on September 5 (Mon), which is the day on which the work is performed).

Moreover, in this example, for each day of the week, in addition to the total number of times detected and the total number of persons detected, the number of times detected and the number of persons detected per alarm level (distinction between caution state and warning state) are included.

As described above, in the sixth example, the information generating unit 303, etc., generates entry degree information including the number of times detected, the number of persons detected, and the like, as in the first to fifth examples. Accordingly, the display control unit 304 can cause the display device 50 to display the generated entry degree information and cause the operator to recognize the entry situation (entry degree) of a person into a predetermined area around the excavator. Furthermore, the information transmitting unit 305 can transmit the generated entry degree information to the management server 200 and have the management server 200 transmit the entry degree information to a computer terminal, a mobile terminal, another work machine or the like at a work site. Therefore, a supervisor and a worker at a work site, an operator of another work machine, etc., can be made to recognize the entry situation (entry degree) of a person into a predetermined area around the excavator. Therefore, it becomes possible to prompt an operator of the excavator, a supervisor and a worker at a work site, an operator of another work machine, etc., to take safety actions, so that the safety at the work site where the excavator is used can be improved, by a mode having relatively immediate effects.

For example, it is possible to recognize the characteristics (increase or decrease, etc.) of the number of times detected and the number of persons detected per day of the week of the latest one week. Therefore, the operator, etc., can refer to the tendency of the same day of the previous week with respect to the other days of the previous week (for example, the number of times detected, etc., is significantly more than that of the other days) to recognize the situation of the work site, and can operate the excavator and perform various kinds of work in a manner that the safety of the work site is improved. Furthermore, for example, instead of the entry degree information, by adopting time-series data of the number of times detected and the number of persons detected per time period (for example, in units of 1 hour, in units of 2 hours, etc.) of a particular day or the last 24 hours, it is possible to recognize the characteristics (increase or decrease, etc.) of the number of times detected and the number of persons detected per time period within the last 24 hours. Therefore, similar to the above, the operator, etc., can refer to the tendency with respect to the same time period of the previous time (for example, in the time period immediately before the end of the work, the number of times detected is significantly larger than the other time periods, etc.) to recognize the situation of the work site, and can operate the excavator and perform various kinds of work in a manner that the safety of the work site is improved. Furthermore, for example, instead of the entry degree information, it is also possible to adopt time-series data of the number of times detected and the number of persons detected per date (per day) in the latest predetermined period (predetermined number of days).

The entry degree information according to the sixth example can be displayed as a graph, in addition to being displayed in a table format, on the display device 50, a computer terminal at a work site, mobile terminal, a display device of another work machine, etc. Hereinafter, with reference to FIG. 11, another example of a display mode when displaying the time-series data such as the number of times detected in FIG. 10 on the display device 50, a computer terminal at a work site, mobile terminal, or a display device of another work machine, will be described.

Figure 11:
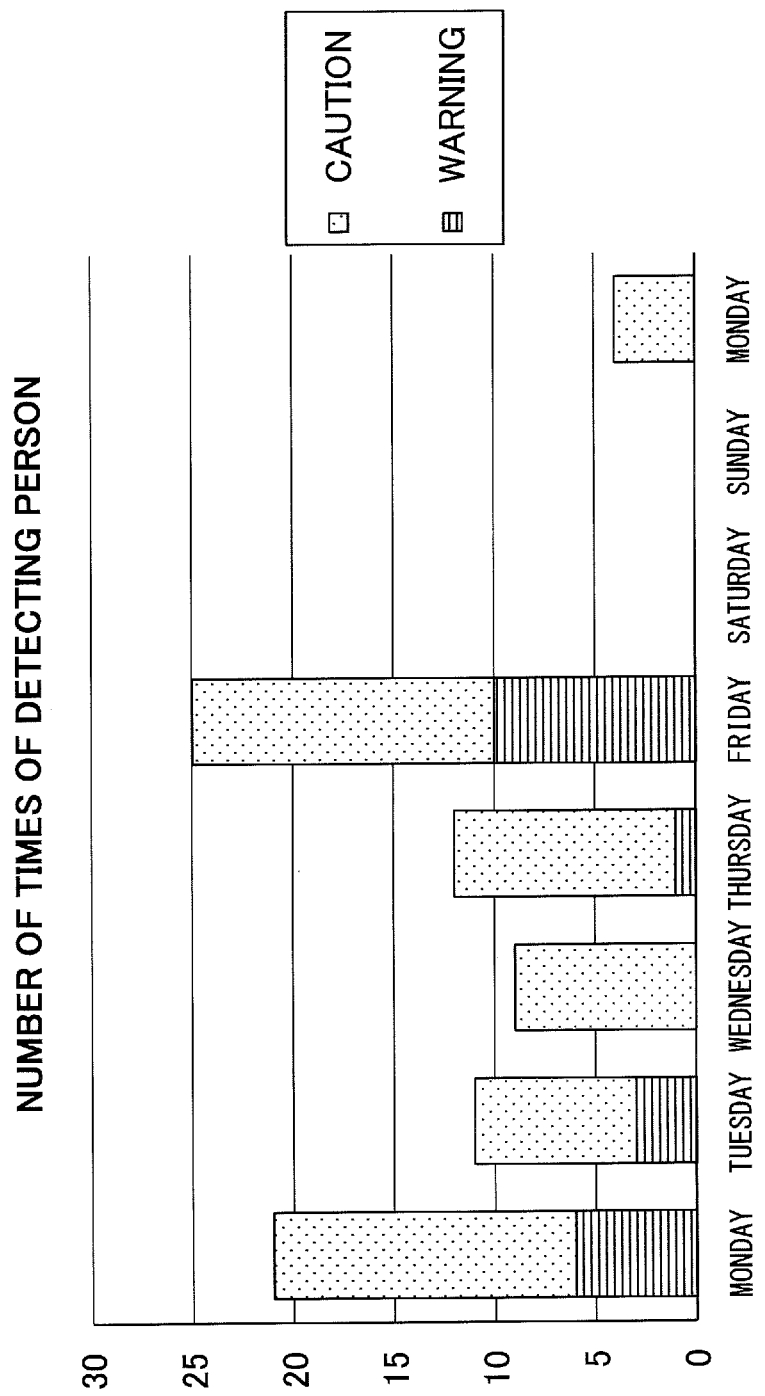
FIG. 11 is a diagram illustrating entry degree information displayed on a display device or the like according to an embodiment of the present invention.

For example, FIG. 11 is a diagram illustrating entry degree information displayed on the display device 50, etc. Specifically, FIG. 11 is a diagram illustrating time-series data of the number of times detected graphically displayed on the display device 50, etc.

The contents of the entry degree information according to this example are the same as the entry degree information illustrated in FIG. 10.

Thus, by graphically displaying time-series data such as the number of times detected, the operator, etc., can easily recognize the characteristics (increase or decrease, etc.) of time-series data of the number of times detected and the number of persons detected per day of the last week. Furthermore, in the total number of times detected, each number of times detected per alarm level is represented by a different display mode (specifically, a display mode in which the caution state is a dot display and the warning state is a lined display), and, therefore, the characteristics of the time-series data per alarm level can be easily recognized. Therefore, the operator, etc., can improve the safety of the work site where the excavator is used, by a mode having even more immediate effects.

Furthermore, entry degree information other than that illustrated in FIGS. 5 to 10 may be generated.

For example, the entry degree information may be in a mode including the number of times detected, the number of persons detected, the number of times of motion limitation, additional information and the like, per work content when a person is detected by the object detecting unit 301. Accordingly, the operator of the excavator, the manager and the supervisor of the work site, and the operator of another work machine, etc., can visually recognize the entry degree information, and recognize the type of work content being performed when there are many people entering the surrounding area of the excavator.

Furthermore, for example, the entry degree information may be in a mode including the number of times detected, the number of persons detected, the number of times of motion limitation, additional information and the like, per setting state of detection performance in which a person is detected by the object detecting unit 301. Accordingly, the operator of the excavator, the manager and the supervisor of the work site, the operator of another work machine, etc., can visually recognize the entry degree information, and examine what kind of detection performance setting state is appropriate, etc.

Furthermore, for example, the entry degree information may be in a mode including the number of times detected, the number of persons detected, the number of times of motion limitation, additional information and the like, per surrounding environment (for example, distinction of morning, daytime, night, or distinction of sunny, cloudy, rainy, etc.) when a person is detected by the object detecting unit 301. Accordingly, the operator of the excavator, the manager and the supervisor of the work site, the operator of another work machine, etc., can visually recognize the entry degree information, and recognize the surrounding environment state in which there are many people entering the surrounding area of the excavator.

Furthermore, for example, the entry degree information may be in a mode including the number of times of motion limitation, additional information and the like, per operation state when the object detecting unit 301 starts the motion limitation of the excavator. Accordingly, the operator of the excavator, the manager and the supervisor of the work site, the operator of another work machine, etc., can recognize the kind of operation being performed, that is, the kind of motion the excavator is making, when the frequency of the motion limitation of the excavator is high, etc. Furthermore, the manager and the supervisor of the work site can examine, for example, whether it is necessary to stop the operation from the viewpoint of work efficiency and safety, with respect to an operation state in which the frequency of the motion limitation of the excavator is high.

Next, FIG. 12 is a diagram illustrating a seventh example of the entry degree information generated by the information generating unit 303, etc.

In this example, unlike the first to fifth examples, the information generating unit 303, etc., generates entry degree information for generating a table by which it is possible to confirm entry related information under a predetermined condition regarding the entry degree. Specifically, the information generating unit 303, etc., displays, in a highlighted manner, items of the entry related information in which the detection frequency (for example, the number of times detected and the number of persons detected per unit time such as one hour, etc.) exceeds a predetermined reference.

As illustrated in FIG. 12, the entry degree information is information in the form of a table associating all items corresponding to the plurality of pieces of entry related information (information on the time period at the time of detection, information on the operation state at the time of detection, information on the work mode at the time of detection, information on the location where a person is detected at the time of detection, information on the attitude stability of the excavator at the time of detection, and information on the operation skill of the operator at the time of detection), with the detection frequency when converted into per unit time corresponding to each of the items.

The detection frequency is calculated, for example, by dividing the number of times detected in the accumulated time corresponding to a certain item of the entry related information, by the accumulated time.

Also, in this example, a predetermined condition relating to the entry degree is satisfied, that is, an item of the entry related information for which the entry degree (detection frequency) is relatively high, is displayed in a highlighted manner (refer to the hatched portions in the figure). Specifically, among all of the items corresponding to the respective pieces of entry related information, the items having a detection frequency of "2.0" or more per unit time are displayed in a highlighted manner.

As described above, the information generating unit 303, etc., generates entry degree information for generating a table by which it is possible to confirm items of the entry related information under a predetermined condition regarding the entry degree (entry frequency) of a monitor target (person) into the predetermined area around the excavator. That is, the information generating unit 303, etc., narrows down the entry related information according to a predetermined condition regarding the entry degree of the monitor target (person) into a predetermined area around the excavator, and generates entry degree information for generating a table by which it is possible to confirm the (item of) entry related information that has been narrowed down according to the predetermined condition. Accordingly, the on-site supervisor and the like can intuitively find out the item of the entry related information for which the entry degree of the monitor target (person) into the predetermined area around the excavator is relatively high. Therefore, the on-site supervisor can consider measures to improve the safety of the work site, for example, based on the condition regarding the found out item of the entry related information that is considered to have relatively low safety.

In this example, the detection frequency based on the number of times detected is used as the condition regarding the entry degree of the monitor target (person) into the predetermined area around the excavator; however, for example, the detection frequency based on the number of persons detected or the motion limitation frequency based on the number of times of motion limitation may be used.

[Display Mode of Entry Degree Information on Management Terminal]

Next, with reference to FIG. 13, a specific example of the display mode of the entry degree information displayed on the display 330 of the management terminal 300 will be described.

Figure 13:
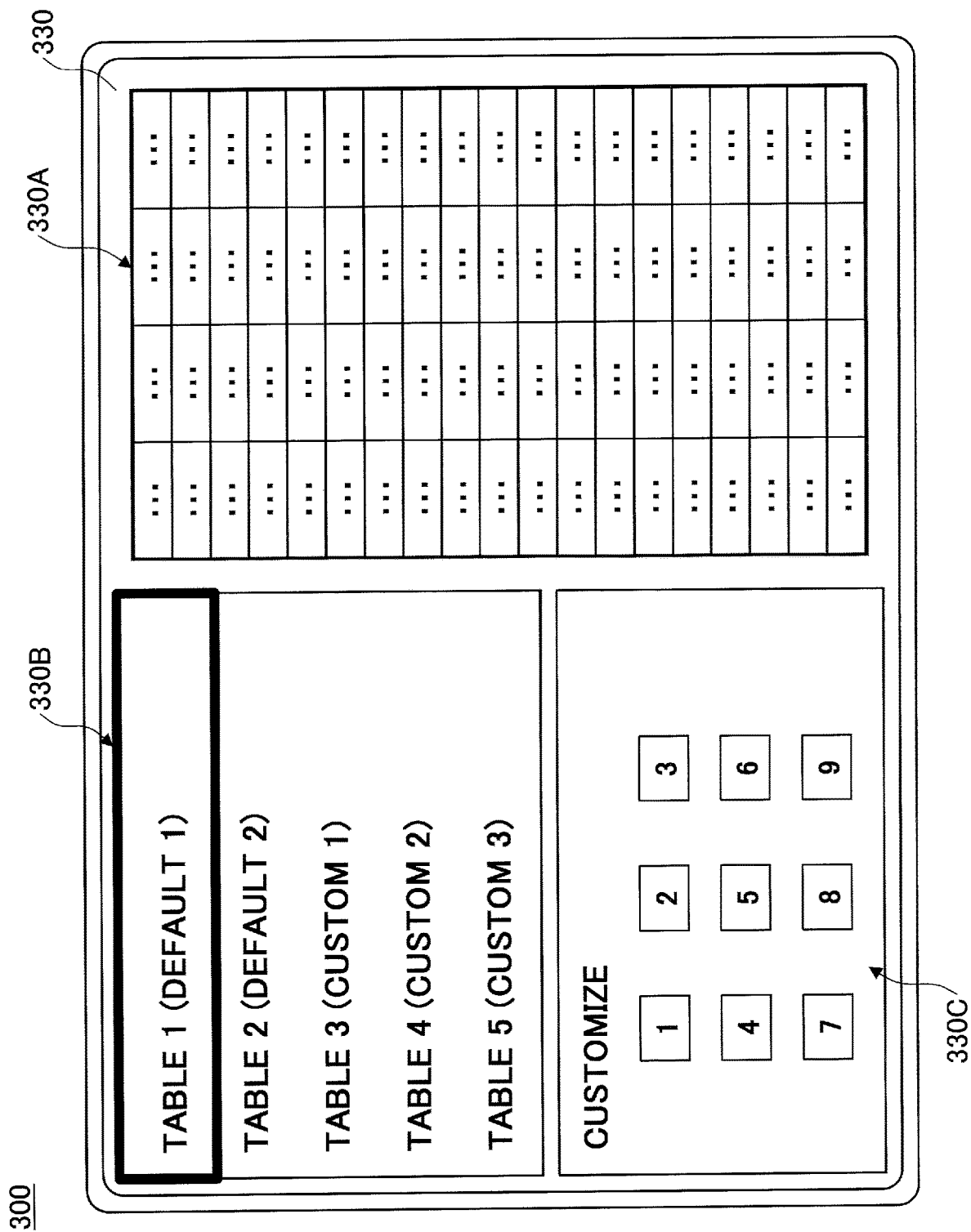
FIG. 13 is a diagram illustrating an example of a display mode of entry degree information on a management terminal according to an embodiment of the present invention.

FIG. 13 is a diagram illustrating an example of a display mode of the entry degree information on the management terminal 300. The display mode is implemented by the display control unit 3202 (that is, the management app) of the management terminal 300 described above.

As illustrated in FIG. 13, a table 330A corresponding to the entry degree information is displayed in the right half area of the horizontally long display 330 of the management terminal 300 of this example.

Furthermore, in the upper half of the left half area of the display 330, a specification selecting unit 330B for selecting the specification of the entry degree information to be displayed as the table 330A is displayed.

In the specification selecting unit 330B, pieces of entry degree information corresponding to a specification registered in advance (for example, a specification of whether to display entry degree information obtained by narrowing down the entry degree information according to a condition related to the entry related information or the entry degree, or specifically under what condition is to be used for narrowing down the information, etc.) are displayed by the names "table 1" to "table 5". The user can perform a predetermined operation, for example, by moving a cursor or the like indicated by a thick frame in the figure by a slide operation of a touch panel or an operation unit (for example, a mouse etc.) according to hardware (not illustrated), to display the entry degree information of a corresponding specification as the table 330A on the display 330.

Furthermore, in the lower half of the left half area of the display 330, a GUI of a customizing unit 330C for registering a specification, to be selected by the user with the specification selecting unit 330B, is displayed. Accordingly, the user can register the entry degree information of the specification that he/she wants to confirm, in the specification selecting unit 330B.

[Display Process of Entry History Information]

Next, processing by the display control unit 304 corresponding to the safety management system 100 according to FIG. 2A will be described with reference to FIG. 14.

Figure 14:
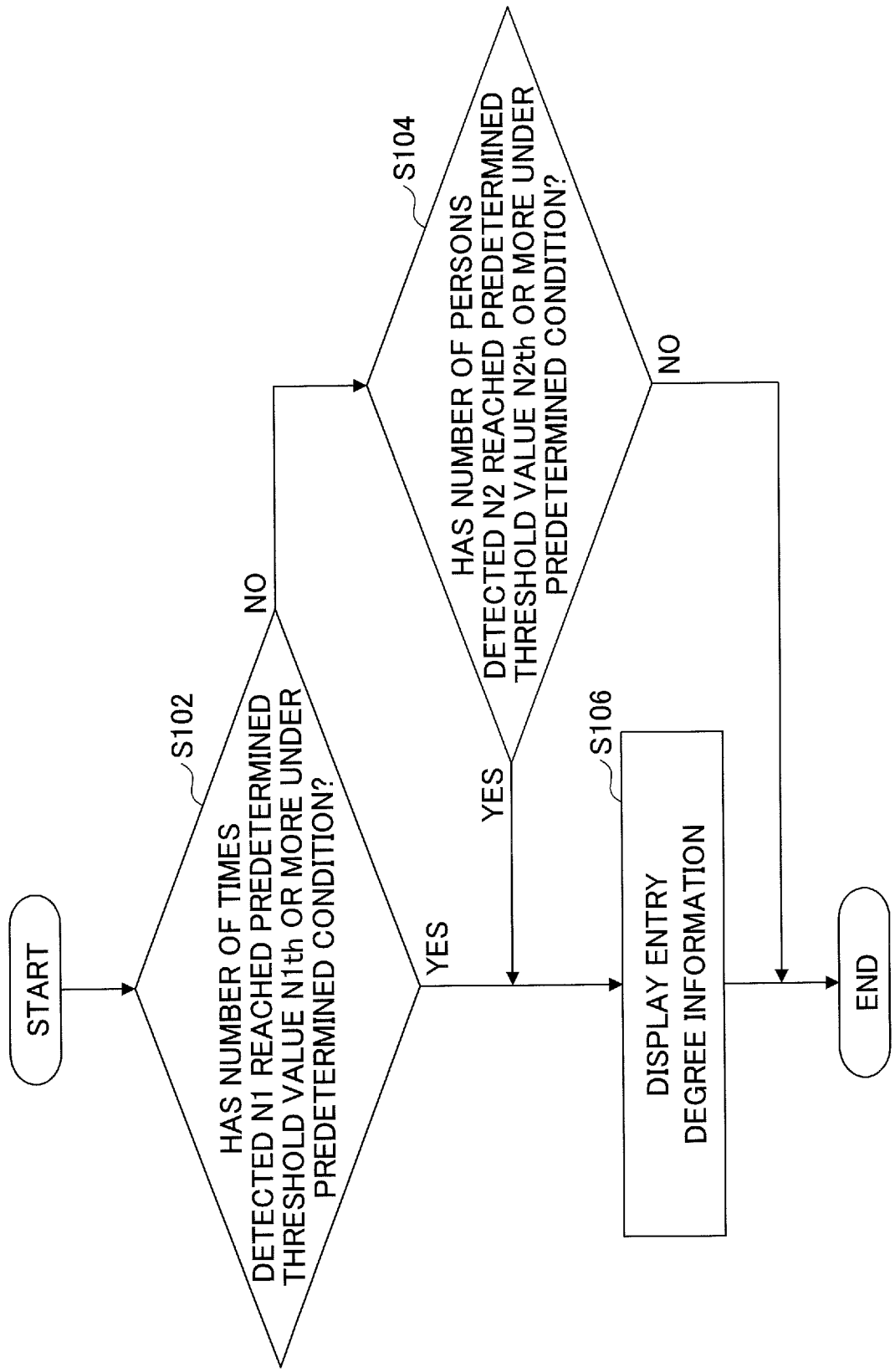
FIG. 14 is a flowchart schematically illustrating an example of processing by a display control unit according to an embodiment of the present invention.

FIG. 14 is a flowchart schematically illustrating an example of processing performed by the display control unit 304. The process according to this flowchart is repeatedly executed, for example, at predetermined time intervals while the excavator is in operation.

In step S102, the display control unit 304 determines whether the number of times N1 of detecting entry of a person into a predetermined area around the excavator by the object detecting unit 301 has reached a predetermined threshold value N1th or more under a predetermined detection condition. The predetermined condition is, for example, at least one of (1) within a predetermined time (within a predetermined time period) from a certain time point, (2) a predetermined detection location, (3) a predetermined operation state, (4) a predetermined operation mode, and (5) a predetermined alarm level, etc. The display control unit 304 proceeds to step S104 when the determination condition is not satisfied, and proceeds to step S106 when the determination condition is satisfied.

Note that the display control unit 304 may determine whether the number of times of motion limitation of the excavator by the object detecting unit 301 (the number of times of motion limitation) has relatively increased (has become greater than or equal to a predetermined threshold value) under a predetermined detection condition. The same applies to step S202 in FIG. 15 described later.

In step S104, under the same predetermined condition as step S102, the display control unit 304 determines whether the number of persons detected N2 entering into a predetermined area around the excavator by the object detecting unit 301 has reached a predetermined threshold value N2th or more. The display control unit 304 proceeds to step S106 when the determination condition is satisfied, and ends the current process when the determination condition is not satisfied.

In step S106, the display control unit 304 causes the display device 50 to display the entry degree information 3102. For example, when the predetermined detection condition is the above (1), the display control unit 304 may cause the display device 50 to display the entry degree information 3102 corresponding to the above-described first example. Furthermore, for example, when the predetermined detection condition is the above (2), the display control unit 304 may cause the display device 50 to display the entry degree information 3102 corresponding to the above-described second example. Furthermore, for example, when the predetermined detection condition is the above (3), the display control unit 304 may cause the display device 50 to display the entry degree information 3102 corresponding to the above-described third example. Furthermore, for example, when the predetermined detection condition is the above (4), the display control unit 304 may cause the display device 50 to display the entry degree information 3102 corresponding to the above-described fourth example. Furthermore, for example, when the predetermined detection condition is the above (5), the display control unit 304 may cause the display device 50 to display the entry degree information 3102 corresponding to the above-described fifth example.

Note that either one of the process of step S104 or the process of step S106 may be omitted. Furthermore, the order of the processes of steps S104 and S106 may be reversed or may be performed as parallel processes. Furthermore, when the process of step S106 is performed, the number of times detected N1 and the number of persons detected N2 are reset, and counting is started again under the predetermined condition.

As described above, when the number of times of detecting entry of a person into a predetermined area (the number of times detected), or the number of detected persons entering a predetermined area (the number of persons detected), or the number of times of performing motion limitation of the excavator (the number of times of motion limitation), detected by the object detecting unit 301, included in the entry degree information 3102, satisfies a predetermined report condition, the display control unit 304 causes the display device 50 to display the entry degree information 3102. Specifically, as the above report condition, when a condition that the number of times detected, the number of persons detected, or the number of times of motion limitation is greater than or equal to a predetermined threshold value is satisfied under a predetermined detection condition, the display control unit 304 causes the display device 50 to display the entry degree information 3102. Accordingly, the entry degree information 3102 is displayed only in a situation where it is necessary to improve the safety of the work site, and, therefore, it is possible to suppress excessive trouble and discomfort inflicted on the operator.

Furthermore, the report condition for displaying the entry degree information 3102 on the display device 50 is not limited to the above mode. For example, as the report condition, when the condition that the number of times detected, the number of persons detected, or the number of times of motion limitation is rapidly increasing is satisfied, that is, the condition that one of these values has increased by greater than or equal to a predetermined reference is satisfied, the display control unit 304 may cause the display device 50 to display the entry degree information 3102. For example, when the number of times detected, the number of persons detected, or the number of times of motion limitation within a predetermined period (a period from the start of work on the first day to the present time, a predetermined time period in a day, etc.) is increased by greater than or equal to 50% of an average value of the past (the average value of each day of last week, the average value of the same time period in the last week, etc.), it may be determined that the number of times detected, the number of persons detected, or the number of times of motion limitation has increased by greater than or equal to a predetermined reference. Accordingly, similar to the above described embodiment, the entry degree information 3102 is displayed only in a situation where it is necessary to improve the safety of the work site, and, therefore, it is possible to suppress excessive trouble and discomfort inflicted on the operator. Furthermore, by appropriately setting the predetermined reference, it is possible to display the entry degree information 3102 at a stage where the number of times detected, the number of persons detected, or the number of times of motion limitation has increased before reaching the predetermined threshold value of FIG. 14, and, therefore, the manager and the supervisor at the work site and an operator of another work machine, etc., can take actions on safety at the work site at an earlier stage.

[Process of Transmitting Entry History Information]

Next, with reference to FIG. 15, the processing by the information transmitting unit 305 corresponding to the safety management system 100 according to FIG. 2A will be described.

Figure 15:
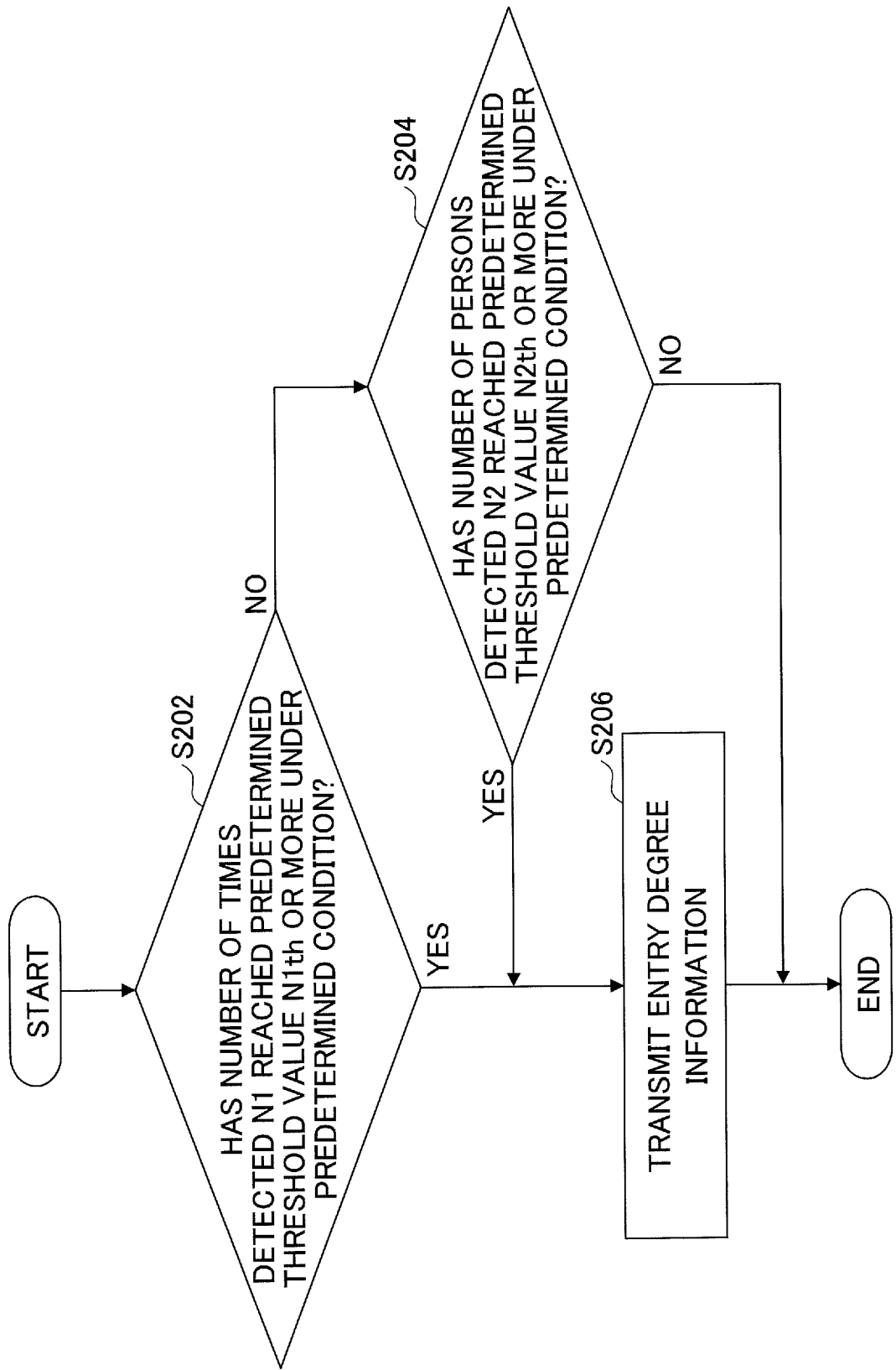
FIG. 15 is a flowchart schematically illustrating an example of processing by an information transmitting unit according to an embodiment of the present invention.

FIG. 15 is a flowchart schematically illustrating an example of processing performed by the information transmitting unit 305. The process according to this flowchart is repeatedly executed, for example, at predetermined time intervals while the excavator is in operation.

In step S202, the information transmitting unit 305 determines whether the number of times N1 of detecting entry of a person into a predetermined area around the excavator by the object detecting unit 301 has reached a predetermined threshold value N1th or more under a predetermined detection condition. The predetermined condition may be, for example, (1) to (5) described above. The information transmitting unit 305 proceeds to step S204 when the determination condition is not satisfied, and proceeds to step S206 when the determination condition is satisfied.

In step S204, under the same predetermined condition as step S202, the information transmitting unit 305 determines whether the number of persons detected N2 entering into a predetermined area around the excavator by the object detecting unit 301 has reached a predetermined threshold value N2th or more. The information transmitting unit 305 proceeds to step S206 when the determination condition is satisfied, and ends the present process when the determination condition is not satisfied.

In step S206, the information transmitting unit 305 transmits the entry degree information 3102 to the management server 200. For example, when the predetermined detection condition is the above (1), the information transmitting unit 305 may transmit, to the management server 200, the entry degree information 3102 corresponding to the above-described first example. Furthermore, for example, when the predetermined detection condition is the above (2), the information transmitting unit 305 may transmit the entry degree information 3102 corresponding to the above-described second example to the management server 200. Furthermore, for example, when the predetermined detection condition is the above (3), the information transmitting unit 305 may transmit the entry degree information 3102 corresponding to the above-described third example to the management server 200. Furthermore, for example, when the predetermined detection condition is the above (4), the information transmitting unit 305 may transmit the entry degree information 3102 corresponding to the above-described fourth example to the management server 200. Furthermore, for example, when the predetermined detection condition is the above (5), the information transmitting unit 305 may transmit the entry degree information 3102 corresponding to the above-described fifth example to the management server 200.

Note that one of the processes of steps S204 and S206 may be omitted. Furthermore, the order of the processes of steps S204 and S206 may be reversed or may be performed as parallel processes. Furthermore, as in the case of FIG. 14, when the process of step S206 is performed, the number of times detected N1 and the number of persons detected N2 are reset, and counting is started again under the above-described predetermined condition.

As described above, under the predetermined detection condition, when the number of times of detecting entry of a person into a predetermined area, or the number of detected persons entering a predetermined area, or the number of times of performing motion limitation of excavator, detected by the object detecting unit 301, becomes a predetermined threshold value or more, the information transmitting unit 305 transmits the entry degree information 3102 to the management server 200. Accordingly, the entry degree information 3102 is transmitted only in a situation where it is necessary to improve the safety of the work site, and, therefore, it is possible to suppress excessive trouble and discomfort inflicted on the manager and the supervisor of the work site, and the operator of another work machine, etc.

The above-described report condition for causing the management server 200 to transmit the entry degree information 3102 is not limited to the above mode, similar to the case of the above report condition for causing the display device 50 to display the entry degree information 3102. For example, similar to the display control unit 304, as the report condition, when the condition that the number of times detected, the number of persons detected, or the number of times of motion limitation is rapidly increasing is satisfied, that is, the condition that one of these values has increased by greater than or equal to a predetermined reference is satisfied, the information transmitting unit 305 may transmit the entry degree information 3102 to the management server 200. For example, when the number of times detected, the number of persons detected, or the number of times of motion limitation within a predetermined period (a period from the start of work on the first day to the present time, a predetermined time period in a day, etc.) is increased by greater than or equal to 50% of an average value of the past (the average value of each day of last week, the average value of the same time period in the last week, etc.), it may be determined that the number of times detected, the number of persons detected, or the number of times of motion limitation has increased by greater than or equal to a predetermined reference. Accordingly, similar to the case of FIG. 14, the entry degree information 3102 is transmitted only in a situation where it is necessary to improve the safety of the work site, and, therefore, it is possible to suppress excessive trouble and discomfort inflicted on the manager and the supervisor of the work site, and the operator of another work machine, etc. Furthermore, by appropriately setting the predetermined reference, it is possible to transmit the entry degree information 3102 at a stage where the number of times detected, the number of persons detected, or the number of times of motion limitation has increased before reaching the predetermined threshold value of FIG. 15, and, therefore, the manager and the supervisor at the work site and an operator of another work machine, etc., can take actions on safety at the work site at an earlier stage.

As described above, although an embodiment for carrying out the present invention has been described in detail, the present invention is not limited to such a specific embodiment, and various modifications and changes may be made within the scope of the gist of the present invention described in the claims.

For example, in the embodiment described above, the display control unit 304 causes the display device 50 to display the entry degree information 3102, and the information transmitting unit 305 transmits the entry degree information 3102 to the management server 200; however, a mode in which either one of these is performed is applicable.

Furthermore, in the above-described embodiment and modifications thereof, in one work machine (excavator), the entry degree information (the entry degree information 3102, the entry degree information 2200A, and the entry degree information 3200A) related to one work machine is generated; however, the present embodiment is not limited to such a mode. For example, the entry degree information relating a plurality of work machines in which the entry history information 3101 stored in each of a plurality of work machines (for example, an excavator, a bulldozer, etc.) performing work at a work site is integrated, that is, entry degree information of the entire work site may be generated. Then, the generated entry degree information may be displayed on the display device visible to the operator of each target work machine, or may be transmitted to the management server capable of communicating with each of the plurality of work machines. At this time, the pieces of entry history information stored in the respective work machines are collected in a particular work machine among the plurality of work machines communicably connected to each other, and at the particular work machine, the entry degree information relating to the plurality of work machines may be created. Furthermore, pieces of entry history information stored in the respective work machines may be shared among the plurality of work machines communicably connected to each other, and at the respective work machines, the entry degree information relating to the plurality of work machines may be created. Furthermore, for example, the management server 200 may acquire entry history information from a plurality of work machines performing work at a work site, and the management server 200 or the management terminal 300 may generate the entry degree information of the entire work site based on the pieces of entry history information relating to the plurality of work machines integrated in the management server 200. Accordingly, the manager and the supervisor of the work site, the operator of each work machine, and the like can recognize the entry degree information of the entire work site through the management terminal 300, the display device 50 of the excavator, and the like. Therefore, it is possible to further promote actions with respect to the safety of the work site.

According to an embodiment of the present invention, a construction machine safety management system capable of improving the safety of a work site where a work machine is used, by a mode having relatively immediate effects, can be provided.

It should be understood that the invention is not limited to the above-described embodiment, but may be modified into various forms on the basis of the spirit of the invention. Additionally, the modifications are included in the scope of the invention.

What is claimed is:

1. A construction machine safety management system comprising:
   a detecting unit that detects entry of an obstacle into a predetermined area around a construction machine; and
   an information generating unit that generates an index of information representing a relationship between multiple historical detected entries of obstacles into the predetermined area and multiple pieces of historical entry-related information, wherein
      each piece of historical entry-related information of the multiple pieces of historical entry-related information includes one or more entry-related parameters relating to the piece of historical entry-related information,
      each piece of historical entry-related information of the multiple historical entry-related information corresponds to a historical detected entry of the multiple historical detected entries, and
      the multiple historical detected entries detected by the detecting unit are indexed by a selected entry-related parameter from among the one or more entry-related parameters, and the generated index of information representing a relationship between multiple historical detected entries of obstacles into the predetermined area and multiple pieces of historical entry-related information includes one or more historical detected entries that satisfy a predetermined condition relating to the selected entry related parameter.

2. The construction machine safety management system according to claim 1, wherein the information generating unit generates the index of the information representing the relationship, based on a predetermined condition relating to the multiple historical detected entries.

3. The construction machine safety management system according to claim 1, wherein the information generating unit generates the index of the information representing the relationship including at least one of a detection frequency indicating the frequency with which the detecting unit detects the obstacle and a detected count number indicating the number of times the detecting unit detects the obstacle.

4. The construction machine safety management system according to claim 1, wherein the predetermined condition includes
   a condition relating to a time period in which the entry of the obstacle into the predetermined area is detected by the detecting unit,
   a condition relating to a location in which the entry of the obstacle into the predetermined area is detected by the detecting unit,
   a condition relating to an operation state of the construction machine when the entry of the obstacle into the predetermined area is detected by the detecting unit,
   a condition relating to a work mode of the construction machine when the entry of the obstacle into the predetermined area is detected by the detecting unit,
   a condition relating to an alarm level of an alarm that is output when the entry of the obstacle into the predetermined area is detected by the detecting unit,
   a condition relating to a distance between the construction machine and the obstacle when the entry of the obstacle into the predetermined area is detected by the detecting unit,
   a condition relating to a subsequent action of a person when the entry of the person that is the obstacle into the predetermined area_is detected by the detecting unit,
   a condition relating to a work content of the construction machine when the entry of the obstacle into the predetermined area is detected by the detecting unit, or
   a condition relating to an operation state of the construction machine when motion limitation of the construction machine is implemented when the entry of the obstacle into the predetermined area is detected by the detecting unit.

5. The construction machine safety management system according to claim 1, wherein the predetermined condition includes
   a condition relating to an elapsed time from alarm start, when the entry of the obstacle into the predetermined area is detected by the detecting unit, to alarm cancellation according to an alarm cancellation operation by an operator,
   a condition relating to an elapsed time from motion limitation start of the construction machine, when the entry of the obstacle into the predetermined area is detected by the detecting unit, to motion limitation cancellation according to a motion limitation cancellation operation by an operator,
   a condition relating to a setting state of detection performance of the detecting unit when the entry of the obstacle into the predetermined area is detected by the detecting unit,
   a condition relating to a surrounding environment when the entry of the obstacle into the predetermined area is detected by the detecting unit,
   a condition relating to a stability of an excavator that is, the construction machine when the entry of the obstacle into the predetermined area is detected by the detecting unit, or
   a condition relating to an operation skill of an operator within a predetermined period when the entry of the obstacle into the predetermined area is detected by the detecting unit.

6. The construction machine safety management system according to claim 2, wherein the predetermined condition includes a condition relating to a detection frequency by the detecting unit.

7. The construction machine safety management system according to claim 6, wherein the condition relating to the detection frequency is a condition that the detection frequency of detecting the obstacle by the detecting unit or a detected count number of the obstacle detected by the detecting unit exceeds a predetermined reference.

8. The construction machine safety management system according to claim 2, wherein the predetermined condition includes a condition relating to an execution frequency of executing a predetermined response by the construction machine in accordance with the entry into the predetermined area being detected by the detecting unit.

9. The construction machine safety management system according to claim 8, wherein the condition relating to the execution frequency is a condition that a number of times that a motion of the construction machine is limited, or a number of times that an alarm of a relatively high alarm level is output from the construction machine, caused by the entry into the predetermined area being detected by the detecting unit, exceeds a predetermined reference.

10. The construction machine safety management system according to claim 4, wherein the information generating unit generates, as the index of the information epresenting the relationship, information relating to a temporal change of a detection frequency of detecting the obstacle by the detecting unit or a detected count number of the obstacle detected by the detecting unit.

11. The construction machine safety management system according to claim 10, wherein the information generating unit generates, as the information relating to the temporal change, time sequence data per day of a week, per date of a month, or per time period, within a predetermined period.

12. The construction machine safety management system according to claim 1, further comprising:
a transmitting unit that is provided in the construction machine and that transmits, to a management apparatus outside the construction machine, the multiple historical detection results obtained by the detecting unit and the corresponding multiple historical predetermined related information, wherein
the information generating unit is provided in the management apparatus or in a management terminal that is communicably connected to the management apparatus.

13. The construction machine safety management system according to claim 1, further comprising:
a display device provided in a cabin of the construction machine or
a transmitting unit provided in the construction machine, wherein
the information generating unit is provided, in the construction machine, and
the display device displays an information image corresponding to the generated index, or
the transmitting unit transmits the generaged index to a management apparatus provided outside the construction machine.

14. The construction machine safety management system according to claim 13, wherein
the generated index includes at least one of a detection frequency of detecting the obstacle by the detecting unit and a detected count number of the obstacle detected by the detecting unit, and upon determining that the detection frequency or the detected count number of the obstacle satisfies a predetermined report condition, the display device displays the information image or the transmitting unit transmits the index of the information representing the relationship to the management apparatus.

15. A management apparatus provided outside of a construction machine that includes a detecting unit that detects entry of an obstacle into a predetermined area around the construction machine, the management apparatus comprising:
an acquiring unit that acquires, from the construction machine, multiple historical detected entries of obstacles into the predetermined area detected by the detecting unit, and multiple pieces of historical entry-related information, wherein
each piece of multiple historical entry-related information of the multiple pieces of historical entry-related information includes one or more entry-related parameters relating to the piece of historical entry-related information,
each piece of historical entry-related information of the multiple historical entry-related information corresponds to a historical detected entry of the multiple historical detected entries; and
an information generating unit that generates an index of information representing a relationship between the multiple historical detected entries and the multiple pieces of historical entry-related information to be displayed, the index being generated by indexing the multiple historical detected entries based on a selected entry-related parameter from among the one or more entry related parameters, wherein
the generated index to be displayed includes one or more historical detected entries that satisfy a condition associated with the selected entry related parameter.

16. The management apparatus according to claim 15, further comprising:
a distributing unit that distributes the generated index to a management terminal possessed by a user, and that causes a display unit of the management terminal to display an information image corresponding to the generated index.

17. The construction machine safety management system according to claim 1, wherein
the multiple historical entry-related parameters include at least one of
a date,
a day of week,
a time of day,
a detection location,
an alarm level,
a subsequent action of the obstacle,
an operation state of the construction machine,
a work mode of the construction machine, or
image information of surroundings of the construction machine, at the time the entry of the obstacle is detected.

18. The construction machine safety management system according to claim 1, wherein
the generated index of the multiple historical detected entries further includes a quantity for conditions associated with the one or more entry-related parameters, other than the selected entry parameter, of the multiple historical detected entries included in the generated index.

* * * * *